United States Patent
Kodama et al.

(10) Patent No.: US 6,710,791 B1
(45) Date of Patent: *Mar. 23, 2004

(54) PORTABLE INFORMATION GATHERING APPARATUS AND INFORMATION MANAGEMENT METHOD

(75) Inventors: Yoshiyuki Kodama, Nagano-ken (JP); Yoshiteru Uchiyama, Nagano-ken (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,026

(22) Filed: Jan. 31, 1997

(30) Foreign Application Priority Data

Feb. 1, 1996 (JP) .............................. 8-016903

(51) Int. Cl.[7] ................................ G09G 5/00
(52) U.S. Cl. .................... 345/835; 345/839; 707/7; 715/537
(58) Field of Search ................. 345/173, 169, 345/350, 340, 156, 179, 1, 901, 903, 77, 357, 104, 439, 835, 838, 839; 379/93.23, 93.17; 707/501, 7, 100, 101, 102; 178/18.03, 18.04, 19.01; 715/515, 522, 525, 526, 530, 537

(56) References Cited

U.S. PATENT DOCUMENTS

| | | | | |
|---|---|---|---|---|
| 5,049,862 A | * | 9/1991 | Dao et al. | 345/179 |
| 5,268,817 A | * | 12/1993 | Miyagawa et al. | 361/679 |
| 5,401,917 A | * | 3/1995 | Yoshida et al. | 345/179 |
| 5,406,307 A | * | 4/1995 | Hirayama et al. | 345/179 |
| 5,453,761 A | * | 9/1995 | Tanaka | 345/173 |
| 5,467,102 A | * | 11/1995 | Kuno et al. | 345/1 |
| 5,634,080 A | * | 5/1997 | Kikinis et al. | 345/156 |
| 5,663,748 A | * | 9/1997 | Huffman et al. | 345/173 |
| 5,673,406 A | * | 9/1997 | Hirayama | 345/350 |
| 5,708,825 A | * | 1/1998 | Sotomayor | 707/501 |
| 5,737,599 A | * | 4/1998 | Rowe et al. | 395/615 |
| 5,745,109 A | * | 4/1998 | Nakano et al. | 345/340 |
| 5,790,122 A | * | 8/1998 | Cecchini et al. | 345/357 |

OTHER PUBLICATIONS

"Mastering WordPerfect 5.1 & 5.2 for Windows" Alan Simpson, 1993, pp. 74–76 and 250256.*

* cited by examiner

*Primary Examiner*—Dennis-Doon Chow
(74) *Attorney, Agent, or Firm*—Hogan & Hartson LLP

(57) ABSTRACT

A portable information gathering apparatus and information managing method in the same make it possible to capture information entered through an input/display tablet, image information entered through an image input device and voice information entered through a voice input device, and other type of information for individual pages, each corresponding to all information displayed at one time on a screen. In response to an instruction given by a user of the portable information gathering apparatus, an attach-to-page icon setting unit attaches icons to desired pages to manage the page information in units of pages. Several of these icons are: an icon for managing the information captured in respective pages by time-related data such as date and time; an icon for specifying a particular page; an icon serving as a memo guide; and an icon for managing the information captured in the respective pages by the type of information.

18 Claims, 17 Drawing Sheets

PORTABLE INFORMATION GATHERING APPARATUS AND INFORMATION MANAGEMENT METHOD

BACKGROUND OF THE INVENTION

1. Field of the Invention

The present invention relates to portable information gathering equipment such as a pen computer and, more particularly, to a portable information gather apparatus which can function to manage captured information on a page basis, and an information management method by the apparatus.

2. Description of the Related Art

In recent years, pen computers and other similar devices have been coming into widespread use as portable information gathering equipment. There are being developed pen computers which can not only record information written on a tablet-screen with an input pen, but can also capture images and spoken statements. There are increasing tendencies to enhance the multifunctional features of such pen computers for greater convenience.

FIG. 21 is a schematic block-diagram showing conventional portable information gathering equipment constructed to perform the function of recording information written on a tablet screen with an input pen and also the function of capturing images and voice inputs. This portable information gathering equipment is constituted primarily by a CPU 1, a ROM 2 in which processing programs and the like are stored, a data memory 3, a tablet 6 which combines a digitizer 4 and an LCD 5 into one piece, an image input device 7, a voice input device 8, a voice output device 9, an information gathering menu selector 10, and a system bus 11 for connecting these components to the CPU 1.

Judging from the illustrated configuration, this type of conventional portable information gathering equipment is designed to capture image and voice information in addition to the pen input information which is known as "ink information" captured through the tablet 6.

In the conventional portable information gathering equipment, however, whenever entering information, a menu selection has to be performed through the information gathering menu selector 11 to properly set the mode in accordance with the type of information to be captured before entering the information. For instance, to enter an image and then characters, the mode must be set first for image input to capture an image, then the mode must changed to character input to take in characters.

For the portable information gathering equipment to be user-friendly, all the different types of captured information, namely, the image information, the voice information, and the ink information, should be handled as a collection on a page basis (hereinafter referred to as "page data"). For example, to record the information about a certain product in terms of one-page information, it would be convenient to enter the image of the product and add the description of the image in terms of voice information or ink information entered using a pen, thus handling all the image, voice, and ink information as a piece of page data, that is, handling them in units of pages.

More specifically, it is desirable that multimedia information, including image information, voice information, and ink information, captured by a user arbitrarily be stored automatically in a storing means as page data, i.e. a single piece of collective data on a page basis without the need for operation by the user so that the user is not even aware of the processing.

This type of conventional portable information gathering equipment, however, has not been designed to automatically handle all of the image information, voice information, and ink information as page data for each page without the need for the performance of operations by the user of the equipment.

Furthermore, this type of information gathering equipment handles a wide variety of information and the volume may be as large as over 100 pages. Therefore, the user is required to manage entered information by alarm setting or some other method according to the type of information when reading a particular piece of information from among the information which has been stored, or reading all related information, or if entered information has any time limit.

In this type of conventional portable information gathering equipment such as a pen computer, it is possible to manage the captured information to a certain extent by setting an alarm or the like by writing date, time, contents of information, etc. according to a predetermined format. However, if such equipment allows information including pen input, image, and voice information to be entered as desired while it does not have any specified format, then it would have to have a function for managing such information whenever it is entered.

SUMMARY OF THE INVENTION

Accordingly, it is an object of the present invention to provide a portable information gathering apparatus and an information management method in the same which obviate the need of setting mode according to information to be captured whether it is image information, voice information, or ink information, which enable a user thereof to enter any type of information as he or she desires, and which permit efficient management of information by efficiently retrieving desired information among entered information, by associating the information on different pages, or by providing information with alarms.

To this end, according to one aspect of the present invention, there is provided a portable multimedia information gathering apparatus for gathering and displaying entered information and for also storing the gathered information, which is equipped at least with: information input means for entering information; page adding icon setting means for pasting an icon corresponding to the information, which has been entered for each page equivalent to one screen by the information input means, to a specified page; and data storing means wherein the information entered through the information input means and the information regarding the icon pasted to the specified page are written at a specified address.

The information to be entered is at least one of: information entered through the input/display tablet for capturing information when the screen thereof is touched and also for displaying the captured information; image information entered through image input means, and voice information, or spoken statements, entered through voice input means.

The icon pasted to the specified page is at least one of: an icon for managing the information captured in respective pages by time-related data such as date and time; an icon for specifying a particular page; an icon serving as a memorandum guide; and an icon for managing the information captured in the respective pages by the type of information.

The information regarding the icon pasted on the specified page written to the data storing means is the information indicating the type of icon and positional information indicating the position where the icon is pasted. The icon information for the icon for managing information captured in the respective pages by the time-related data such as date and time is the time-related information including date and time as well as the information indicating the type of icon and the positional information.

With this arrangement, an icon corresponding to information captured on each page can be pasted to captured information, and these different types of icons are pasted on a page basis as desired, thus enabling the pages to be managed by the types of icons pasted on the pages. This makes it possible to set such functions as alarm, To Do, quick call, and automatic erase in units of pages, to permit a background stamp such as a telephone memorandum to be pasted on each page, and to classify page information by type by using the icons. These features are extremely convenient for managing and retrieving data which has been entered.

According to another aspect of the present invention, there is provided an information managing method in a portable multimedia information gathering apparatus which gathers and displays entered information and also stores the gathered information, whereby an icon, which corresponds to the information captured for each page equivalent to one screen by information input means, can be pasted to a specified page, and when the icon has been pasted in a predetermined position on the page, the information entered through the information input means together with the information regarding the pasted icon are written at a specified address in data storing means, thus implementing information management based on the written information regarding the icon.

The information to be entered is at least one of the information captured through the input/display tablet which captures information when the screen thereof is touched, the image information captured through the image input means, and the voice information captured through the voice input means.

The icon pasted on a specified page is at least one of the following icons: an icon for managing information captured into the pages by time-related data such as date and time; an icon for specifying a particular page; an icon serving as a memorandum guide; and an icon for managing information captured into the pages by the type of information.

The information regarding the icon pasted on the specified page which is written to the data storing means is the information indicating the type of icon and the positional information indicating the position where the icon is pasted. The information regarding the icon, if the icon is the one for managing the information captured into the pages by time-related data such as date and time, is the information related to time including date and time.

Use of the method described above allows icons to be pasted according to the information captured into the pages and also the pages to be managed by the type of icon by pasting different types of icons as desired in units of pages. This makes it possible to set such functions as alarm, To Do, quick call, and automatic erase in units of pages, to permit a background stamp such as a telephone memorandum to be pasted on each page, and to classify page information by type by using the icons. These features are extremely convenient for managing and retrieving data which has been entered. Applying the method in accordance with the present invention to a pen computer or the like turns it into an extremely user-friendly pen computer.

DESCRIPTION OF THE PREFERRED EMBODIMENT

An embodiment of the present invention will now be described. This embodiment will use a pen computer as the portable information gathering equipment.

Figure 1:
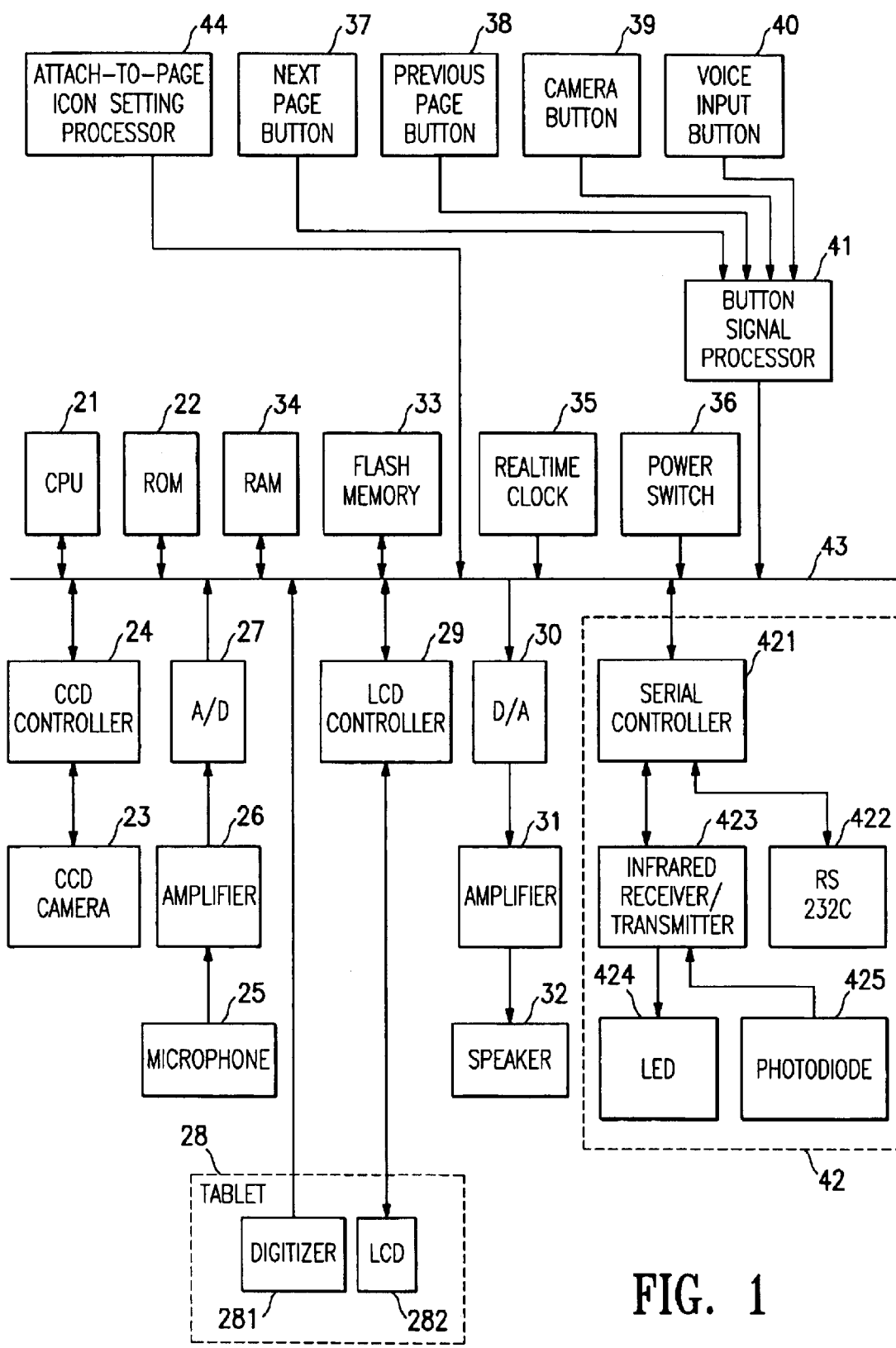
FIG. 1 is a block diagram illustrative of the configuration of an embodiment of apparatus according to the present invention.

FIG. 1 is a block diagram illustrative of the configuration of the entire embodiment of a pen computer to which the present invention has been applied. The pen computer is constituted primarily by: a CPU 21; a ROM 22 for storing basic processing programs for the pen computer and a program and data necessary for gathering information according to the present invention (the processing procedure based on the program will be described in detail later); a CCD camera 23 for capturing image information; a CCD controller 24 for driving the CCD camera 23 and for converting the signals received from the CCD camera to digital signals; a microphone 25 for capturing voice information; an amplifier 26 for amplifying voice signals received from the microphone 25; an analog-to-digital converter 27 for converting the voice signals to digital signals; an input/display tablet 28 which combines a digitizer 281 and a liquid crystal display (LCD) 282 into one unit and which captures information including characters and line drawings and which also displays the captured information; an LCD circuit controller 29; a digital-to-analog converter 30 for converting the voice signals to analog signals when outputting voice signals; an amplifier 31; a speaker 32; a flash memory 33 serving as a data storing means for storing data captured by a user (the data to be stored in the flash memory and the storing areas thereof will be described in detail later); a RAM 34 used as a work memory when implementing various types of processing in the pen computer; a real time clock 35 which indicates the current time and provides time information and date information; a power switch 36; page feed buttons which are comprised of a next page button 37 and a previous page button 38; a camera button 39; a button signal processor 41 which detects the ON/OFF state of a button such as a voice input button 40 and issues signals corresponding to the ON/OFF state; an external equipment connecting device 42 for the transfer of information between itself and external information processing equipment such as a personal computer; a system bus 43 for interconnecting the individual sections and component units; and an attach-to-page icon setting processor 44 which carries out various types of processing on attach-to-page icons which are pasted to respective pages so as to manage information captured into the pages by time-related data such as date and time or classify the information by type or to indicate a background of a memorandum, etc. The attach-to-page icons, which are to be attached to pages, are put on respective pages as if they were stamped thereon; therefore, the icons will be hereinafter referred to as "stamps" which will be described in detail later.

The external equipment connecting device 42 is constructed primarily by: a serial controller 421; an RS232C port 422 used as an interface for connection to external information processing equipment such as a personal computer; an infrared receiver/transmitter 423 for performing optical communication with information processing equipment such as a personal computer; a light emitting diode (LED) 424; and a photo diode 425.

Figure 2:
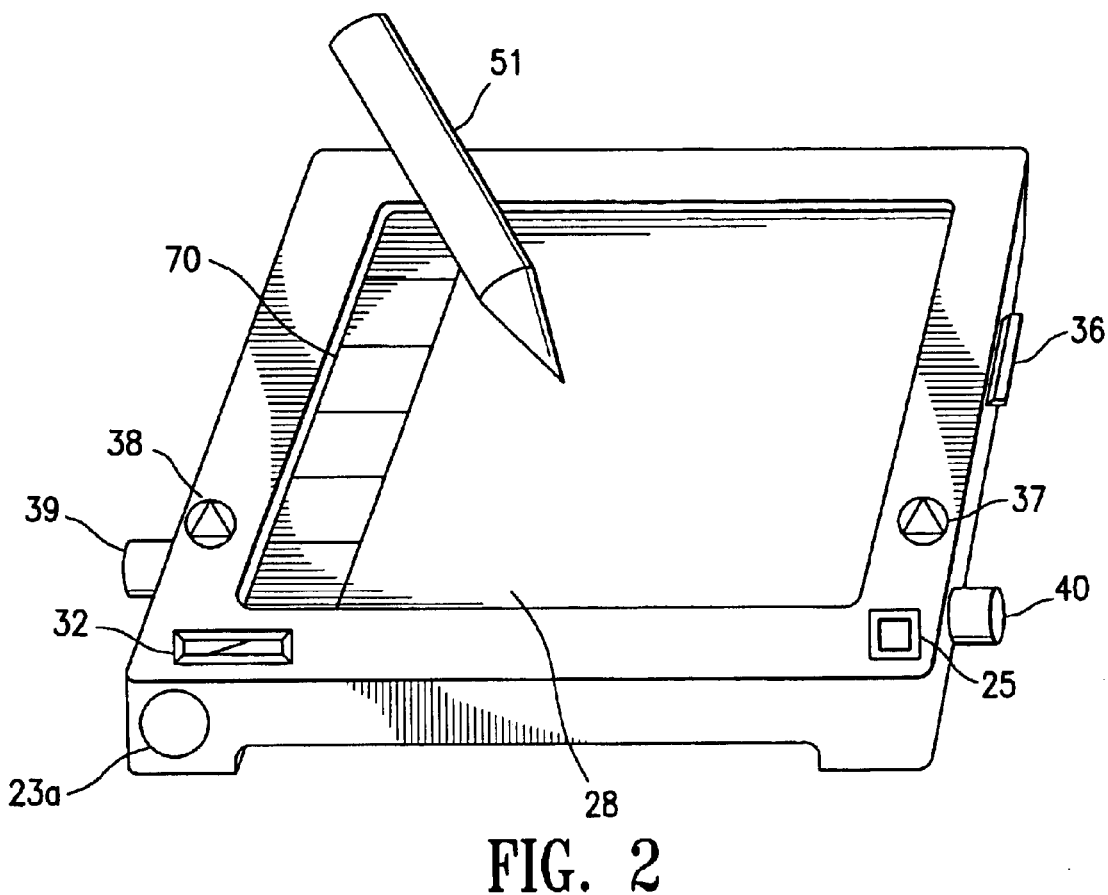
FIG. 2 is an external view of a pen computer to which the present invention is applied.

FIG. 2 shows an external view of the pen computer in accordance with the present invention; components identical to those shown in FIG. 1 are assigned the same reference numerals as in FIG. 1. Among the constituent elements shown in FIG. 1, those that appear in the external view of FIG. 2 include the CCD camera 23 (more precisely a lens 23a of the CCD camera 23), the camera button 39, the tablet 28, the microphone 25, the speaker 32, the voice input button 40, the next page button 37, the previous page button 38, and the power switch 36. Provided on the screen of the tablet 28 is a function menu selector 70. An input pen 51 is used to draw characters or lines on the screen of the tablet 28 and to point at icons.

Figure 3:
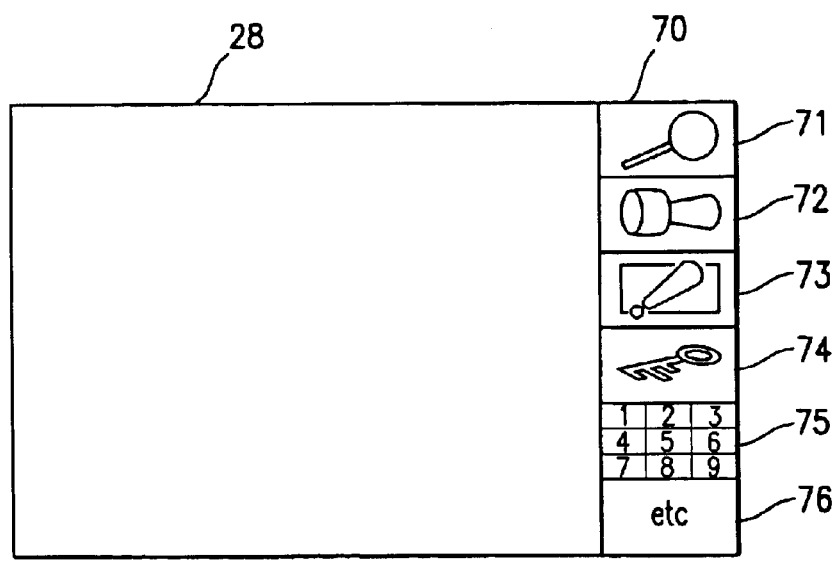
FIG. 3 is a diagram showing an example of a function menu selector which has been set beforehand.

As illustrated in FIG. 3, the function menu selector 70 pre-displays icons indicating menus, including a "find" icon 71, an icon 72 for calling up the list of stamps, a quick call icon 73 for immediately calling a particular page, a key word-setting icon 74 for finding information, a 9-page display icon 75 for displaying the information of nine pages at the same time on the tablet screen, and an icon 76 for specifying other menus. These icons are shown in the form of patterns or the like which visually show the functions of the icons. When one of the icons is pointed at, the contents of, or information identifying, the icon are displayed on the screen.

Figure 4:
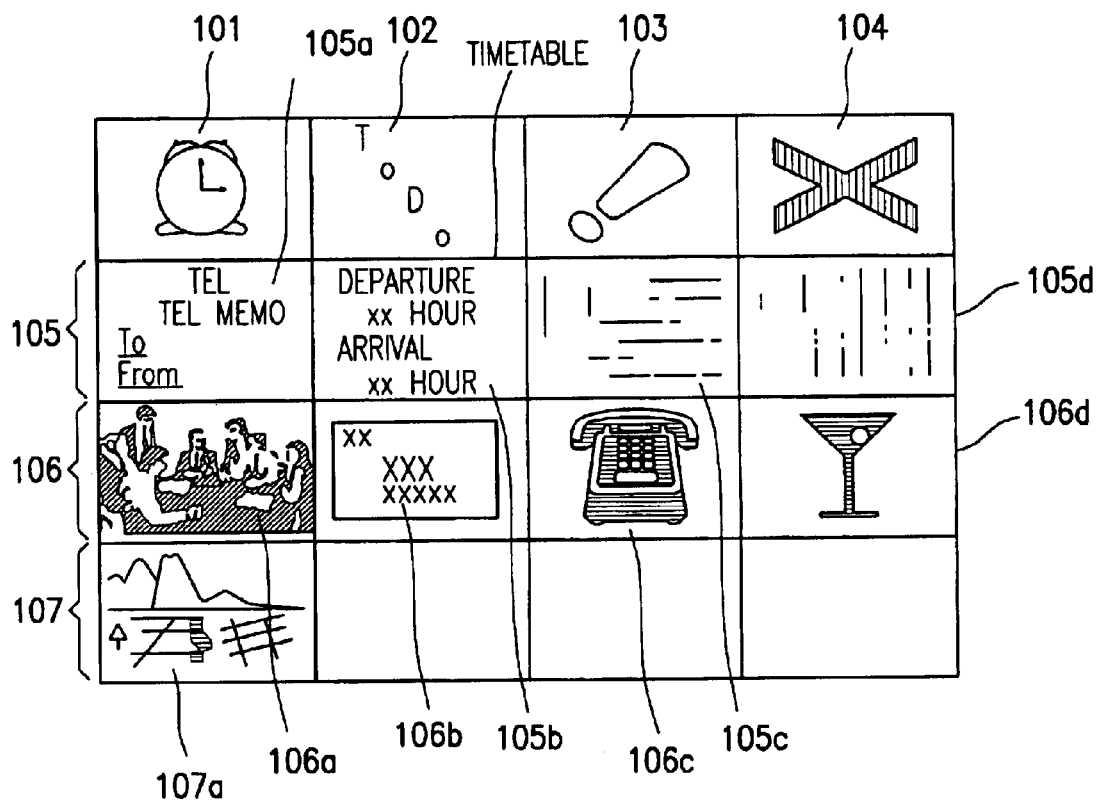
FIG. 4 is a diagram showing an example of a list of stamps which is displayed when a stamp is selected through the function menu selector.

For instance, among the icons mentioned above, if the icon 72 for calling up the list of stamps is pointed at, then the list of stamps as shown in FIG. 4 will appear on the screen of the tablet 28. These stamps are used to manage information by each page or to provide background pictures. The meanings and functions of the individual, stamps will be described later.

When the 9-page display icon 75 is pointed at after the power switch is turned ON, a total of nine pages of information are displayed at the same time in reduced sizes, including four pages each preceding and following a particular page which is the page displayed when the power switch is turned ON and which is normally the page previously processed. Therefore, this icon serves also as an index; however, no further description will be given about this icon because it is not directly connected to the present invention.

In such a pen computer when characters or line pictures are written on the screen of the tablet 28 with the input pen 51, the CPU 21 inside reads coordinates from the digitizer 281 and displays the writing trace in the corresponding position of the LCD 282 and stores the coordinate data at a predetermined address of the flash memory 33.

To input an image through the CCD camera 23, the lens 23a of the CCD camera 23 is pointed at the image to be captured and the camera button 39 is first depressed halfway. This causes the image entered through the lens 23a to be projected as an animation on the screen of the tablet 28; and when the camera button 39 is further depressed, the image is locked and the locked image is captured. The image signal is converted to a digital signal by the CCD camera controller 24 before it is stored at a predetermined address in the flash memory 33.

To input spoken information, the voice input button 40 is depressed to enable audible speech to be captured through the microphone 25; the spoken sounds are then amplified through the amplifier 26 and converted to a digital signal by the analog-to-digital converter 27 before it is stored at a predetermined address in the flash memory 33.

The operation for capturing information is performed in units of screens, i.e. on a page basis. The following will describe the processing procedure.

If the pen computer has never been used, when the power switch 36 is turned ON, nothing will be displayed on the screen of the tablet 28; this screen will be regarded as the first page. However, the following will describe an example wherein some information has already been captured into the first page and additional information will be captured on the second and subsequent pages.

In this example, the user of the pen computer will meet a person, whom he has never met before, to have a business discussion during which he will capture information regarding the person and the details of the discussion and also information about a product, which is the topic of the business discussion.

Figure 5A:
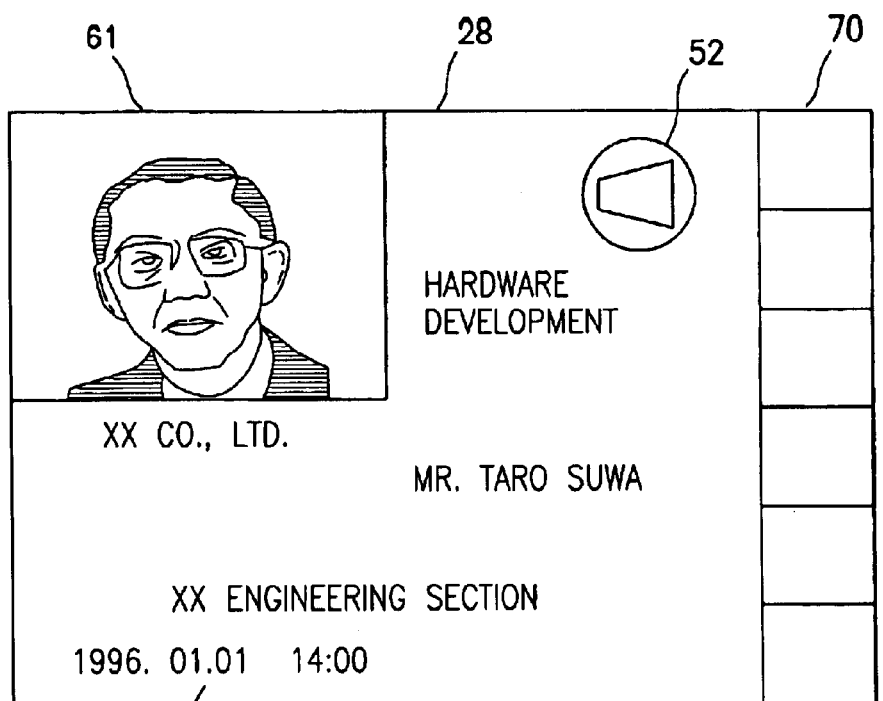
FIGS. 5A and 5B are diagrams showing an example of displayed information which has been captured into the pen computer.

When the user first turns ON the power switch 36, the first page into which information has already been captured will be displayed. Pressing the next page button 37 causes the screen of the second page, into which no information has been captured yet, to be displayed. With the blank second page on the screen, in order to capture the image of the face of the person with whom the user is meeting, the user points the lens 23a of the CCD camera 23 at the person and depresses the camera button 39 halfway as previously described, then further, e.g. fully, depresses the camera button 39. This causes the then-existing face image, which is a stationary image, to be captured and the face image to be displayed on the screen of the tablet 28 at the same time, as shown in FIG. 5A; the image data is stored at a predetermined address of the flash memory 33. The position and size of the area where the image is displayed may be preset in the display area on the screen of the tablet 28 or they may be set according to the situations of each case.

Figure 5B:
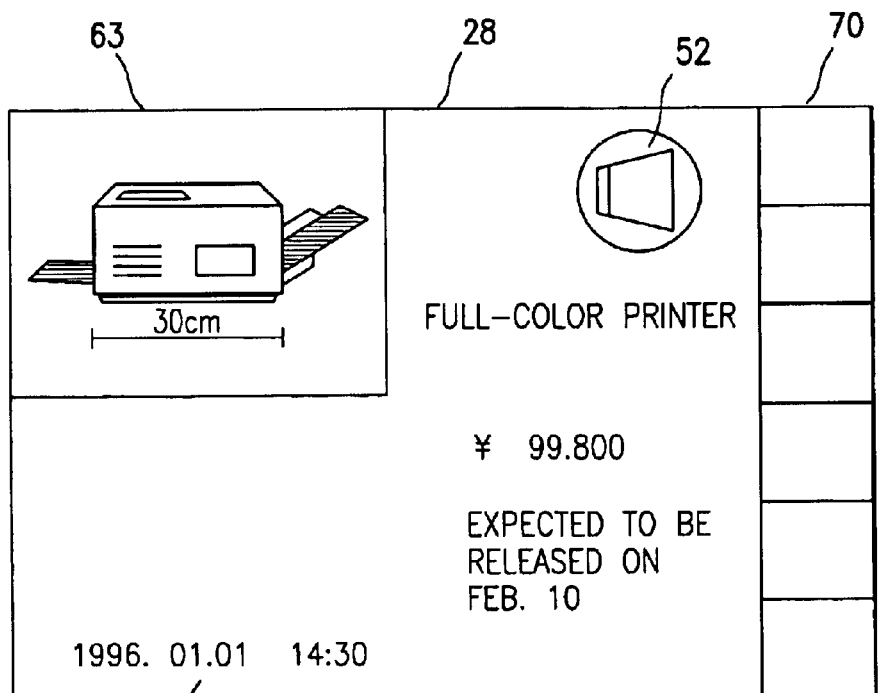

FIGS. 5A and 5B show examples where an area of about one-quarter of the display screen at top left thereof is set as the image area.

The user of the pen computer then writes with the input pen 51 memo-like information including the name of the person, the company name and the department or section to which he belongs as the information regarding the person. The ink information, such as characters or line drawings, entered with the input pen 51 is displayed on the screen of the tablet 28 as the user draws them and it is also stored at a predetermined address in the flash memory 33.

Furthermore, to record an important part of the discussion in terms of spoken statements, the voice input button 40 is depressed to capture the such statements. The captured voice is subjected to digital conversion and stored as a voice signal at a predetermined address in the flash memory 33. Upon completion of capturing the voice, an icon 52 indicating the completion of recording appears at a predetermined point on the screen of the tablet 28. This icon 52 is used also for function reading. To be more specific, when the data on the page is read later, the voice information is read and reproduced from the predetermined address in the flash memory 33 by pointing at the icon 52 with the input pen 51.

FIG. 5A shows an example where the information which has been captured according to the procedure described above is displayed on the screen of the tablet 28, that is, the information on the second page. As it is seen from. FIG. 5A, the visual information of the page information of one page unit is given by face image information 61, ink information 62 such as characters and line drawings, and the icon 52 which indicates the presence of the voice information in the captured information.

In addition to the information mentioned above, the information indicating the date at that point is also displayed automatically by the real-time clock 35. The date and time information is also written at a predetermined address in the flash memory 33 as part of the additional information to go with the captured information which includes the image, voice, and ink information.

To go on to the next page, namely the third page, to capture new information after finishing the collection of information for the second page, the user presses the next page button 37 to use the third page for capturing more information.

The write area for the data stored in the flash memory 33 will be described later.

FIG. 5B shows an example of the information written to the third page in which an image 63 of the product as the image information and character information 64 including the product name and characteristics thereof such as the price and the outline of performance have been entered; and voice information such as a spoken remark "this product is planned to be released on xx day of xx month" has also been entered to add to the above image and character information. In this case also, the icon 52 is displayed when the voice information is captured.

Thus, information can be captured on a page basis; all types of information, namely, the image information, the ink information, and the voice information, can be captured into each different page as the user desires without the need of selecting menus, that is, without the need of changing the mode. In other words, as soon as finishing the input of the image, the user can immediately start entering characters or line drawings with the input pen 51 and then enter the voice information arbitrarily. There is no particular order of capturing these different types of information of image, ink, and voice; they may be captured in any order. Also, it is not necessary to enter all types of information of image, ink, and voice; only one type or a combination of two types may be entered.

As previously described, when the icon 72 for calling up the list of stamps from the function menu selector 70 is pointed at, the list of stamps shown in FIG. 4 appears on the tablet screen; stamps shown in this list of stamps in this embodiment are an alarm stamp 101, a ToDo stamp 102, a quick stamp 103, an automatic erase stamp 104, a background stamp 105, a regular stamp 106, and a user-defined stamp 107. These stamps are shown in terms of patterns so that the functions thereof may be seen at a glance. The types of stamps given in this embodiment are just examples; there are not limited thereto.

Figure 6A:
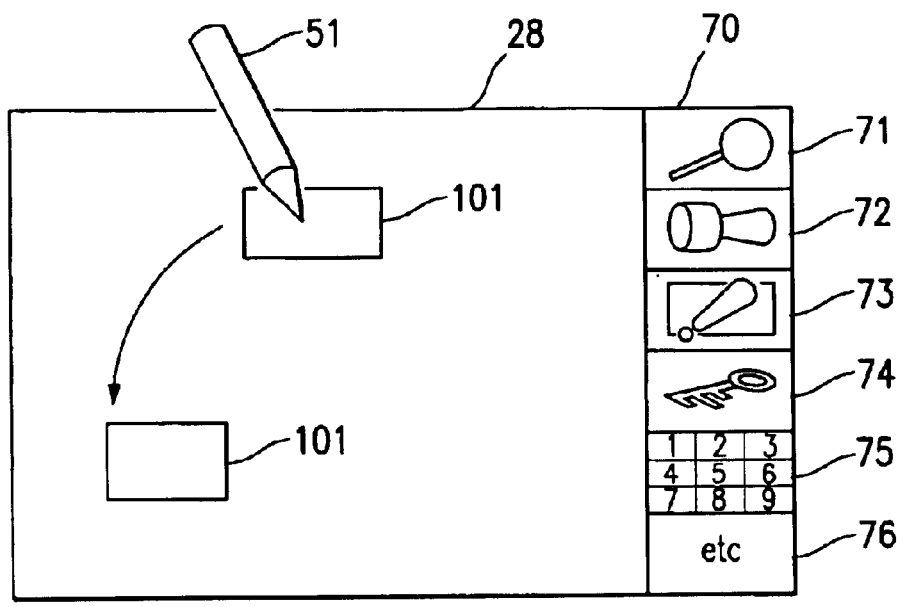
FIGS. 6A and 6B are diagrams illustrating the display operation when an alarm stamp has been selected.

When a particular stamp in the list of stamps is pointed at with the input pen 51, the list of stamps disappears from the screen, leaving only the selected stamp on the screen. If, for example, the alarm stamp 101 is pointed at, then only the alarm stamp 101 is displayed as indicated in FIG. 6A. The selected stamp can be dragged using the input pen 51 to any location on the screen, also as indicated in FIG. 6A.

The alarm stamp 101 enables an alarm to be set for captured information; the stamp provides a function to notify the user by the alarm on the day for which the alarm has been set.

Figure 6B:
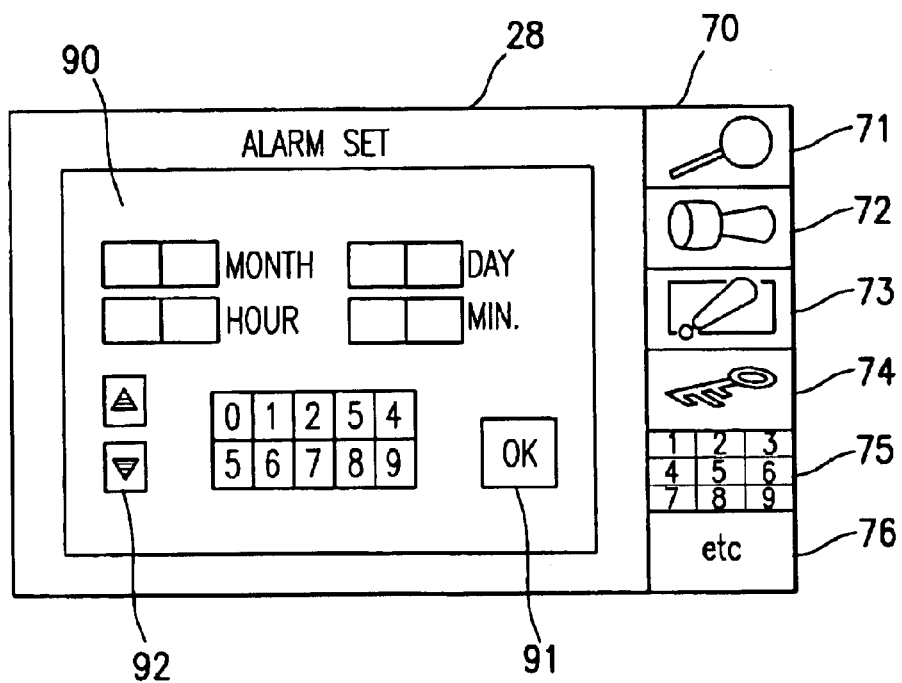

When the alarm stamp 101 is selected from the list of stamps, the list of stamps disappears as described above and only the alarm stamp 101 remains on the screen. When the alarm stamp 101 is pointed at, the display as shown in FIG. 6B is given on the screen.

The alarm stamp is conveniently used, for example, when a reply must be given to an associated party by a certain date on a topic which has been captured on a certain page. To set such an alarm, the icon 72 for calling up the list of stamps is selected from the function menu selector 70 after the information for the page has been captured, then the list of the stamps is opened on the screen of the page and the alarm stamp 101 is selected. This causes an alarm setting box 90 shown in FIG. 6B to be displayed on the screen. Filling the square area of the alarm setting box 90 with values indicating the date and time, e.g. 12 (month) 25 (day), 9 (hour) 30 (min.), sets the alarm for this page. After checking that the set date and time are correct, a box 91 which says "OK" is pressed.

The values may be set in several different ways; they may be set by focusing on the value entering area and pressing numeral feeding marks (▲·▼) 92 until the desired values are obtained, or they may be set by entering the desired values by handwriting with the input pen.

When the alarm has been set as described above, an alarm is given by an electronic sound or vibration to notify the user that the date and/or time for which the alarm has been set has arrived.

The ToDo stamp 102 is used to set the date or time on or at which something is planned to be done. Selecting the ToDo stamp 102 from the list of stamps shown in FIG. 4 causes the list of stamps to disappear from the screen, leaving only the ToDo stamp 102 on the screen. Pointing at the ToDo stamp 102 brings up on the screen the display as shown in FIG. 7 which is almost the same as the alarm stamp.

The ToDo stamp 102 is conveniently used, for example, when a reply must be given to an associated party by a certain date on a topic which has been captured in a certain page. The icon 72 for calling up the list of stamps is selected from the function menu selector 70 after the input of the information for the page has been completed. Then, the list of the stamps as shown in FIG. 4 is opened on the screen of the page and the ToDo stamp 102 is selected. This causes a ToDo setting box 10 shown in FIG. 7 to be displayed on the screen. Filling the square area of the ToDo setting box 110 with values indicating the due date and time, e.g. 12 (month) 25 (day), 9 (hour) 30 (min.), completes the ToDo setting for this page. After checking that the set date and time are correct, a box 111 which says "OK" is pressed.

The ToDo stamp is primarily intended for retrieval by retrieving only the pages which carry the ToDo stamps, all the page information requiring follow-up can be read. The procedure for retrieval will be described later.

Figure 7:
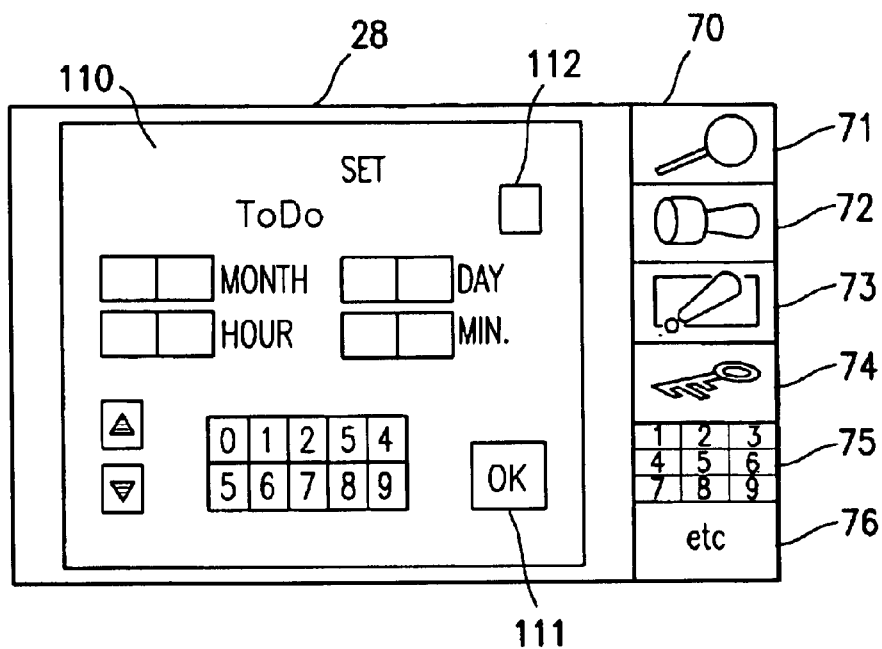
FIG. 7 is a diagram illustrating the display operation when a ToDo stamp has been selected.

The ToDo column 110 displayed when the ToDo stamp 102 has been selected has a "done" check box 112 as shown in FIG. 7; the "done" check box 112 may be pressed for a set item which has already been done so that the pages with the "done" column checked will be excluded when retrieving the pages carrying the ToDo stamps.

Figure 8:
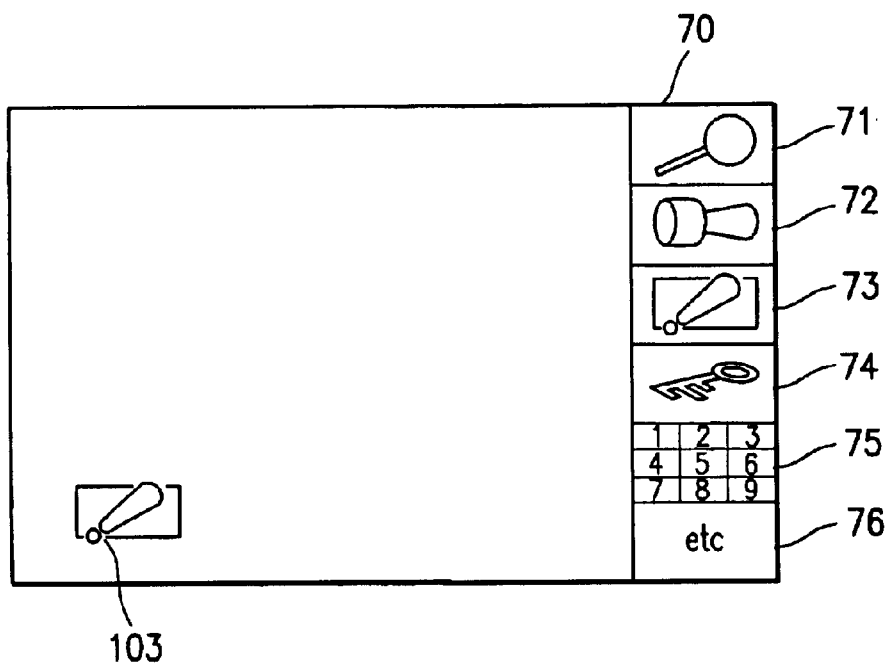
FIG. 8 is a diagram illustrating the display operation when a quick stamp has been selected.

The quick stamp 103 enables quick call of a particular page; it is used, for example, to quickly call up a particular page into which information has been captured. To set this quick call, the icon 72 for calling up the list of stamps is selected from the function menu selector 70 after the input of the information for the page has been completed. Then the list of the stamps is opened on the screen to paste the quick stamp 103 in a desired position on the page as illustrated in FIG. 8. This enables the page, which carries this quick stamp, to be called immediately later by pointing at the quick call icon for quick call 73 in the function menu selector 70. It should be noted that the quick stamp 103 can be pasted only on one particular page; it cannot be pasted on a plurality of pages. Hence, if the quick stamp should be attached to the second page while the quick stamp has already been attached to the first page, then the quick stamp on the, first page will automatically be deleted.

The automatic erase stamp 104 is used to set a date on which the information captured into a particular page should be automatically erased when the preset date comes.

Figure 9:
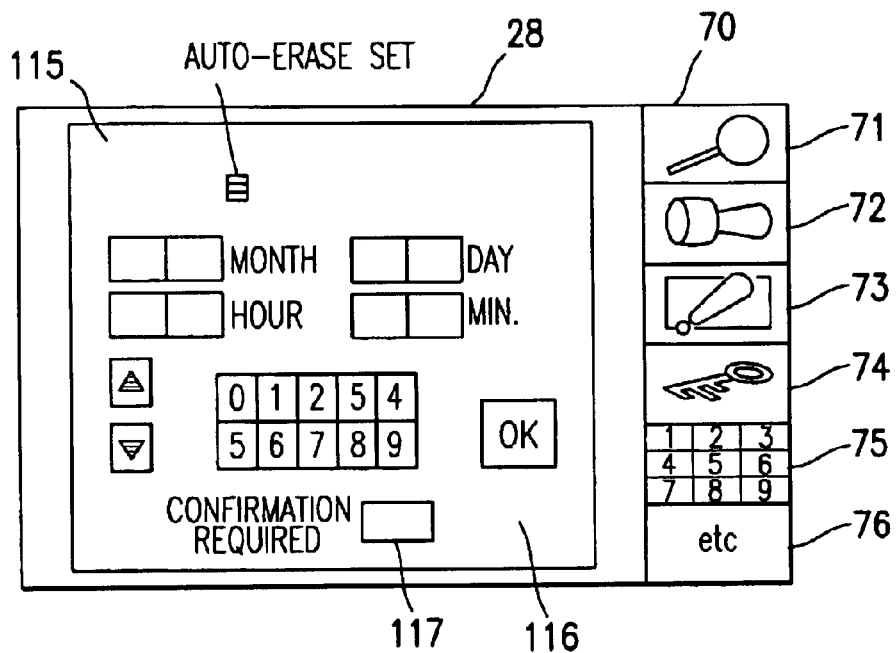
FIG. 9 is a diagram illustrating the display operation when an erase stamp has been selected.

This stamp is used, for example, as follows: when it is already known that the information captured into a particular page will no longer be necessary after a certain period passes, the icon 72 for calling up the list of stamps is selected from the function menu selector 70 after capturing of information into the page has been completed, and the list of stamps is opened on the screen of the page to point at the automatic erase stamp 104. This causes the list of stamps to disappear from the screen, leaving an automatic erase setting box 115 for setting the date and time for automatic erasing displayed on the screen as shown in FIG. 9. Filling the square area of the automatic erase setting box 115 with values indicating the due date and time, e.g. 12 (month) 25 (day), 9 (hour) 3Q (min.) completes the automatic erase setting for this page; when the set date and time comes, the information captured in the page will be automatically erased. For this stamp also, a box 116 which says "OK" is pressed after checking that the set date and time are correct.

The setting column of the automatic erase stamp 104 has, in addition to the date and time setting area, a confirmation setting box 117 for setting whether the user should be asked to confirm if it is really alright to erase the information before actually erasing it. If the confirmation setting box 117 has been pointed at, then a message such as "The day has come to erase the information of the page. Erase?" appears as soon as the user turns ON the power switch of the pen computer when the preset day has come. If the confirmation setting box 117 has not been activated, then the contents of the page carrying the automatic erase stamp 104 will be automatically erased when the set day and time come.

Figure 10:
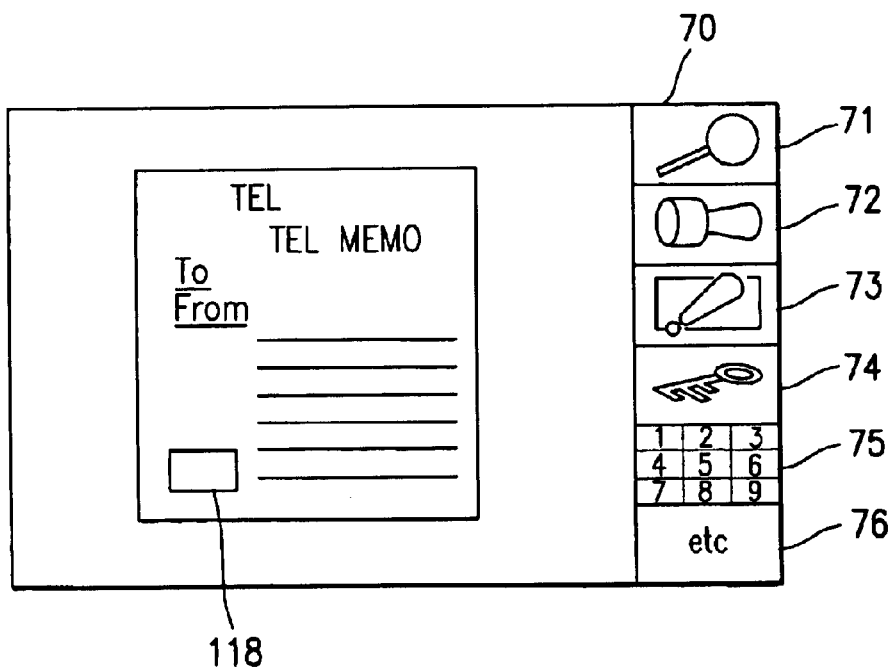
FIG. 10 is a diagram illustrating the display operation when a background stamp has been selected.

Pointing at the background stamp 105 in the list of stamps causes the list of stamps to disappear, leaving only the background stamp 105 on the screen. In this embodiment, several different formats are prepared for the background stamp 105 to allow the user to select an appropriate one from among the prepared formats according to each application. As seen from the list of stamps shown in FIG. 4, in this embodiment the available formats include a background stamp 105a for a telephone memorandum, a background stamp 105b for timetable memorandum of trains or the like, a background stamp 105c providing only a horizontal ruled-line notepad, and a background stamp 105d providing only a vertical ruled-line notepad, which have been prepared in advance for the background stamp 105. When the background stamp 105a for a telephone memorandum is selected, the telephone memorandum form appears as a form, or background, on the screen. FIG. 10 shows an example where the telephone memorandum background stamp 105a is displayed; it does not show any information captured into the page.

Thus, the background stamp 105 serves as a form for easy entry for each different type of memorandum that the user needs and it also facilitates retrieval by background. The retrieval by background is performed, for example, to read out only those pages that have the telephone memorandum stamp 105a.

These background stamps 105 are provided with directive stamp boxes 118 which are pointed at to erase the background stamps 105 or to activate a certain function such as the one for changing the density of the ruled lines of the background stamps.

The regular stamp 106 is not intended for setting any particular function; this stamp is conveniently used for future retrieval by placing it on, or associating it with, pages according to the type of information captured in each page so as to classify the captured information by type.

In this embodiment, regular stamps which have been prepared include a meeting stamp 106a, a business card stamp 106b, a telephone number stamp 106c, and a party stamp 106d.

The meeting stamp 106a is attached to a page into which minutes or the like of a meeting or the like have been captured. This stamp is attached just like other stamps described already; the icon 72 for calling up the list of stamps is selected from the function menu selector 70 and the list of stamps is opened on the screen of the page, then the meeting stamp 106a is put in a desired position on the page. Thus, if the meeting stamp 106a is attached to pages when the minutes of several meetings have been entered in the individual pages, then the pages carrying the meeting stamp can be called when retrieving through the function menu selector 70. Other.regular stamps are used in the same manner.

The user-defined stamps 107, such as scenic stamp 107a, are used in the same way as the regular stamps; they can be created by the user and meanings thereof can be defined by the user.

Figure 11A:
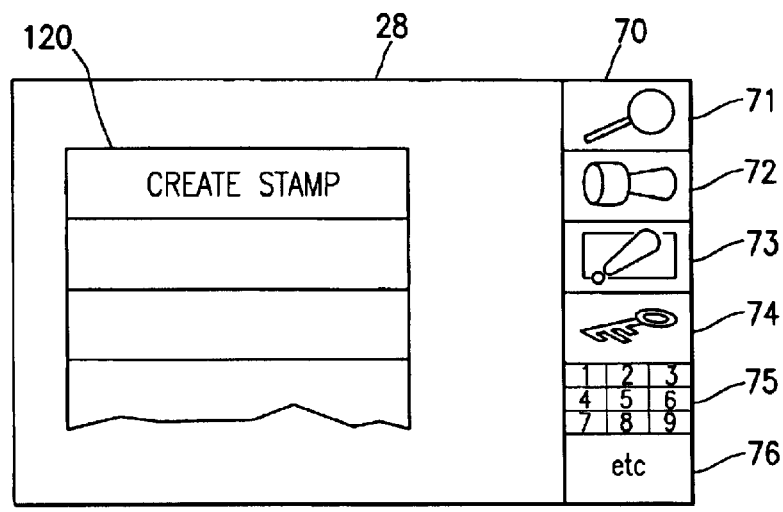
FIGS. 11A, 11B and 11C are diagrams illustrating the display operation when a user-defined stamp has been selected.
Figure 11B:
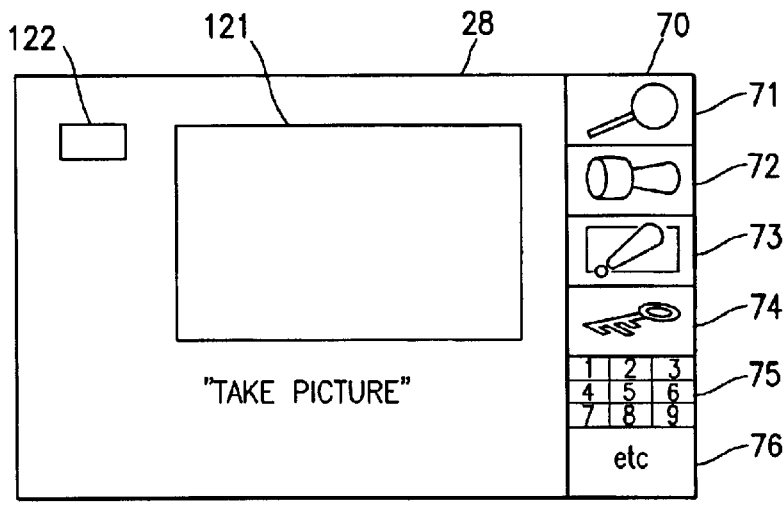

To create the user-defined stamp, the "etc." icon 76 is selected through the function menu selector 70. As shown in FIG. 11A, this brings up on the screen of the tablet 28 a list of menus 120 in which several other menus are written in addition to the "CREATE STAMP" menu. Selecting the "CREATE STAMP" from menu among them brings up on the screen a monitor screen 121 and a box 122 of the actual stamp size in addition to a message such as "Take a picture", as shown in FIG. 11B. The user takes in an image using the CCD camera 23 shown in FIG. 2 while watching the monitor 121. In this case, the image to be captured is used as the pattern of the stamp; therefore, an image suited for the contents of the stamp should be captured for future convenience. For instance, an image of a mountainous landscape is captured to create a travel memorandum stamp and this stamp may be attached to a page in which information has been entered during a trip for convenient future retrieval.

The camera button 39 is depressed while watching the image displayed on the monitor screen 121 to capture the image. This causes the image, i.e. a stationary image, which provides the stamp pattern, to be captured and the captured image is reduced before it is displayed in the box 122 of the actual stamp size.

Figure 11C:
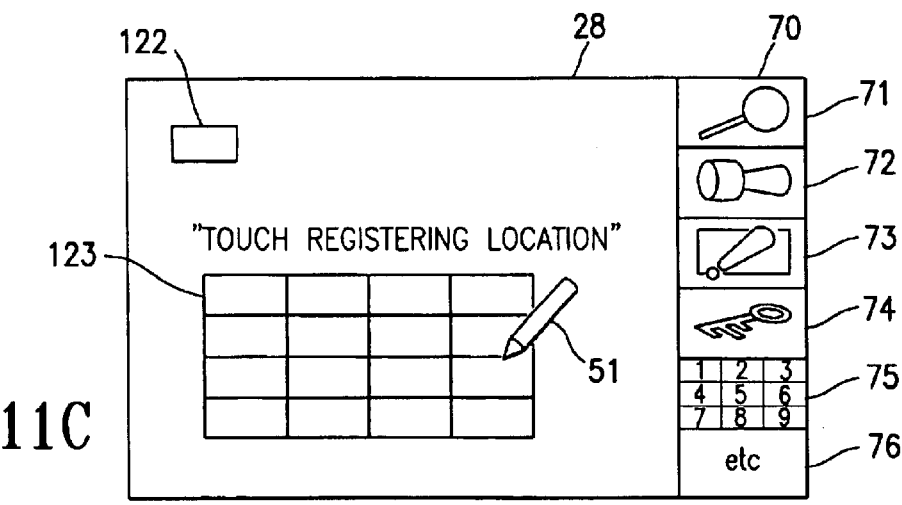

When the image has been captured, a list of stamps 123 (see FIG. 4) appears as shown in FIG. 11C with a message such as "Touch the location for registration." When the user specifies, using the input pen or the like, one of the available areas given in the list of stamps 123 as the location for registering the created stamp, the image which has just been captured as the stamp pattern is registered in the specified area as a new regular stamp or a user-defined stamp. Up to about ten new regular stamps may be registered as the user-defined stamps.

To erase the stamps described above, an erase button, not shown, is provided in a predetermined position of the external structure shown in FIG. 2. A desired stamp and the accompanying stamp information are erased by touching the attached stamp while holding this erase button depressed. The erase button may be a hardware element such as a push-button or it may be an erase icon as one of the function menus, so that an erase mode can be set by touching the erase icon, thereby erasing a predetermined stamp together with the accompanying stamp information.

Figure 12:
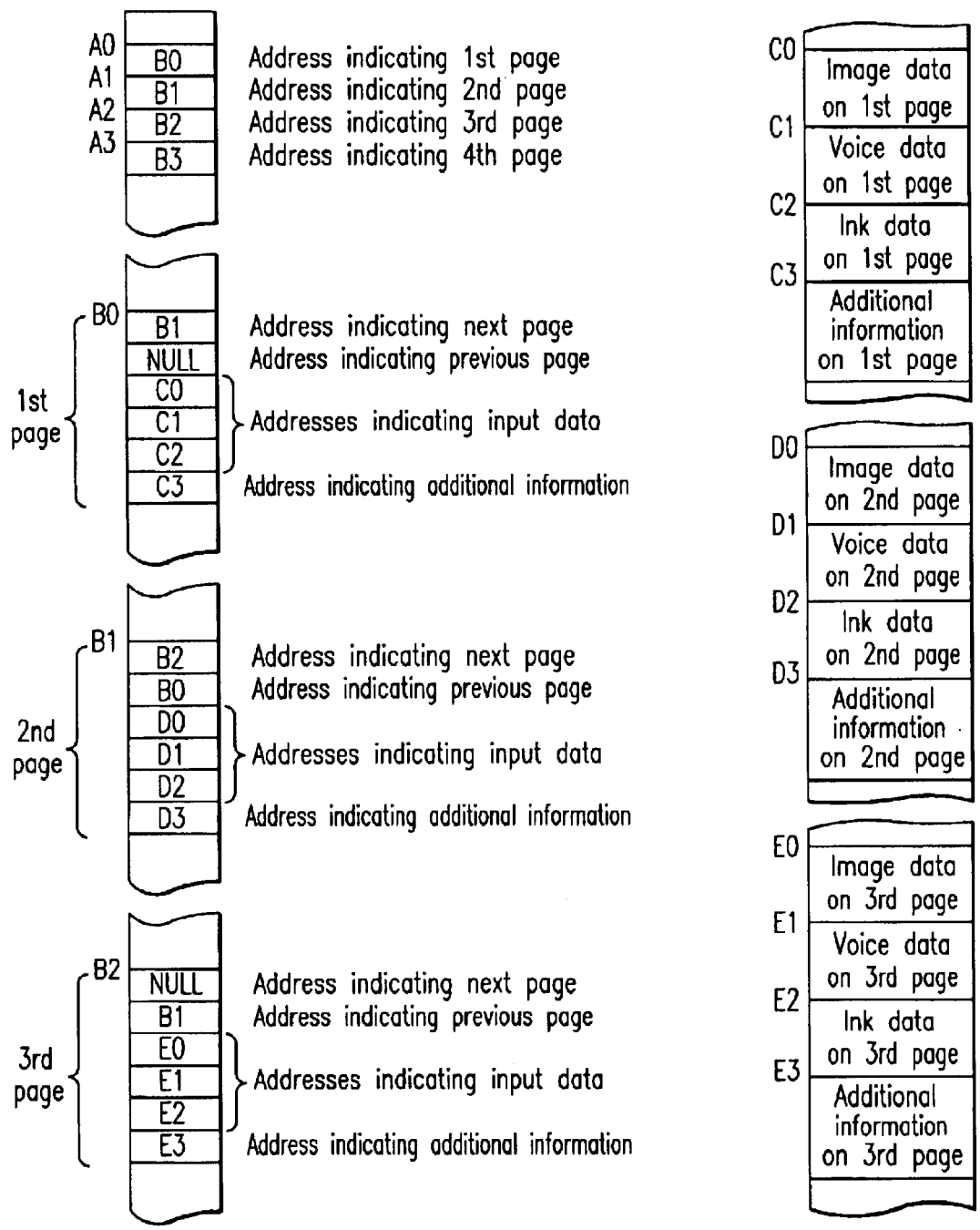
FIG. 12 is a diagram illustrating the contents of a flash memory.

FIG. 12 shows an example of the information capturing process and the contents of the flash memory 33 when stamps have been attached to the captured information. FIG. 12 shows the stored contents of a page, namely the third page, to which data is currently being entered, the previous page, namely the second page, and the further previous page, namely the first page. A description will now be given with reference to FIG. 12.

In FIG. 12, written to addresses A0, A1, A2, and so on are the addresses where the information of respective pages has been stored for each page which has the information.

The aforesaid addresses A0, A1, A2, and so on form a page address area showing the address for each page into which information has been captured. Written at the address A0 is an address B0 as the address at which the information of the first page has been stored; written at the address A1 is the address B1 as the address at which the information of the second page has been stored; and written at the address A2 is the address B2 as the address at which the information of the third page has been stored. Thus, the addresses at which the information of the respective pages has been stored are written for the pages into which information has been captured.

Addresses B0, B1, B2, and so on form an address area which indicates the contents of pages and to which the addresses indicating the area where the information regarding the respective pages has been stored. Written at the address B0, where the information on the first page has been stored, is B1 as the address at which the information of the next page, i.e. the second page in this embodiment has been stored. "NULL", which means that the page is the first page, is written as the address at which the information on the preceding page has been stored. Further, C0, C1, and C2 are written as the addresses at which the information captured into the first page has been stored, and C3 is also written as the address at which the additional information of the first page has been stored.

Written at the address B1 where the information regarding the second page has been stored are: B2 as the address where the information regarding the next page, i.e. the third page in this embodiment, has been stored; B0 as the address where the information on the preceding page, i.e. the first page in this embodiment, has been stored; D0, D1, and D2 as the addresses where the information captured into the second page has been stored; and D3 as the address at which the additional information to the second page has been stored. The same applies to the third and subsequent-pages.

The image information for the first page is stored at the address C0; the voice information for the first page is stored at the address C1; the ink information for the first page is stored at the address C2; and the additional information for the first page is stored at the address C3. Likewise, the image information for the second page is stored at the address D0; the voice information for the second page is stored at the address D1; the ink information for the second page is stored at the address D2; and the additional information for the second page is stored at the address D3.

The example illustrated in FIG. 12 shows the various types of information including the image data, voice data, ink data, and additional information to respective pages which are written in the flash memory in order on the basis of pages; however, the locations where the information is written are specified by the addresses such as C0, C1, and so on, D0, D1, and so on, and E0, E1, and so on which indicate the input data writing positions for the respective pages and the information is not necessarily written at consecutive addresses in units of pages. For instance, the address C0 may be assigned to the image data of the first page, the address D2 may be assigned to the voice data of the first page, the address E1 may be assigned to the ink data of the first page, and the address D3 may be assigned to the additional information of the first page; or the address C1 may be assigned for the image data of the second page, the address E0 may be assigned to the voice data of the second page, the address C2 may be assigned to the ink data of the second page, and the address C4 may be assigned to the additional information of the second page.

The information indicating the addresses of the respective pages which are written at the addresses B0, B1, and B2 has a two-way list structure, so that a leading address may be shared by the related pages, namely the preceding and following pages in this embodiment.

For example, the address B2 which indicates the next page and which is written at the address B1 (second page) indicates the leading address of the area where the information of the third page is stored. Likewise, the address B0 which indicates the preceding page and which is written at the address B1 (second page) indicates the leading address of the area where the information on the first page is stored.

Similarly, the address B1 which indicates the previous page and which is written at the address B2 (third page) indicates the leading address of the area where the information on the second page is stored. Thus, the leading address can be shared by the preceding and following pages.

Such a list structure is convenient for deleting or inserting data. When, for example, the second page is deleted, the leading address of the third page as the following page may be used for the first page and the leading address of the first page as the preceding page may be used for the third page, thus permitting easy page insertion or deletion.

In this manner, the information for each page is written in the flash memory 33.

Figure 13:
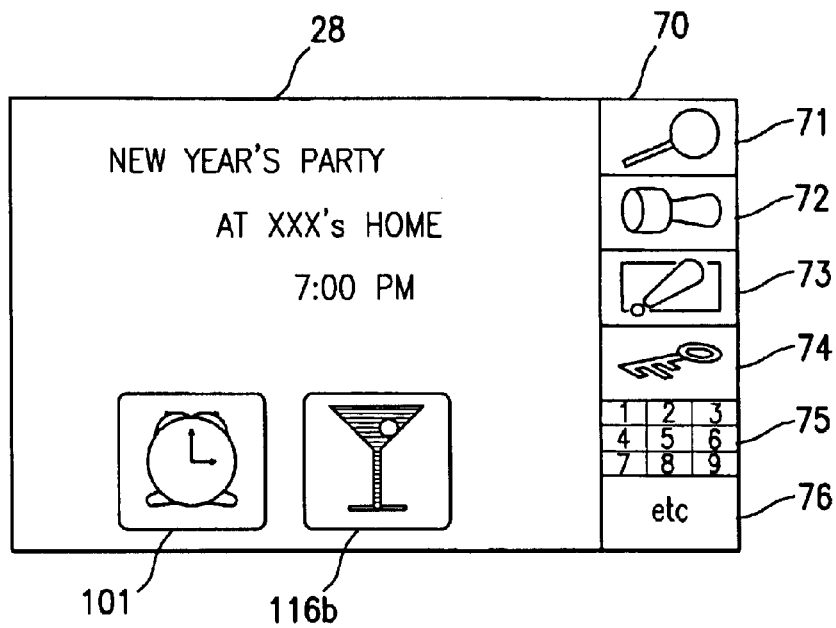
FIG. 13 is a diagram showing an example of a display screen wherein a stamp has been pasted.
Figure 14:
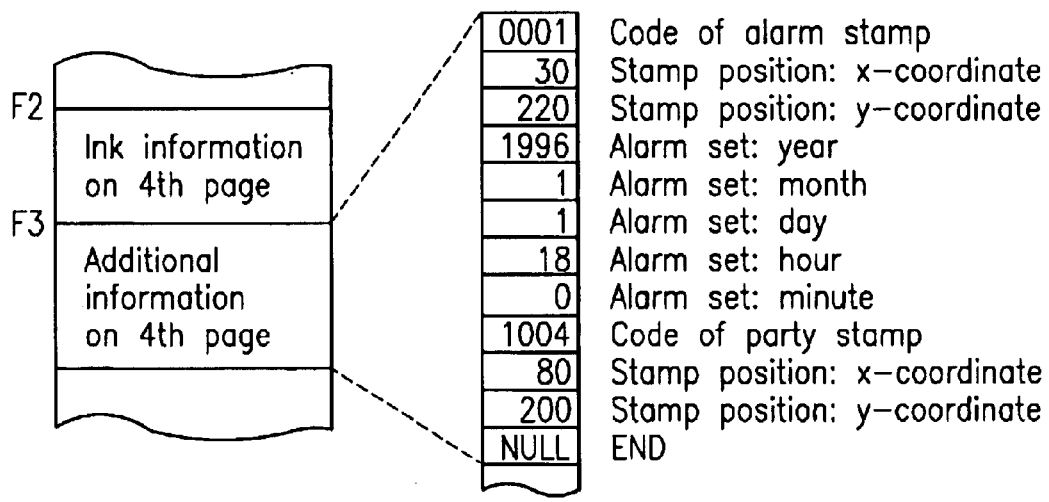
FIG. 14 is a diagram illustrating the contents of the memory of additional information for the page information to which a certain stamp has been attached.

The additional information for each page mentioned above provides the date and time information received from the real-time clock 35 or provides information regarding stamps when the stamps are attached to pages. In this embodiment, however, description will be given on the assumption that the additional information refers only to the information regarding the attached stamps in order to simplify the drawings and to make description easier to understand. For instance, when the alarm stamp 101 and the party stamp 106d as a regular stamp have been attached to the fourth page into which information (only ink information in this case) has been captured as illustrated in FIG. 13, the memory contents of the additional information in this case will be as shown in FIG. 14.

More specifically, primarily written at an address F3 of the additional information of the fourth page are: a code "0001" indicating the alarm stamp 101; positional coordinates where the alarm stamp 101 is attached; the date and time for which the alarm has been set; a code "1004" indicating the regular stamp, namely, the party stamp 106d in this case; positional coordinates where the regular stamp is attached; and "NULL" indicating that there is no more data.

Figure 15:
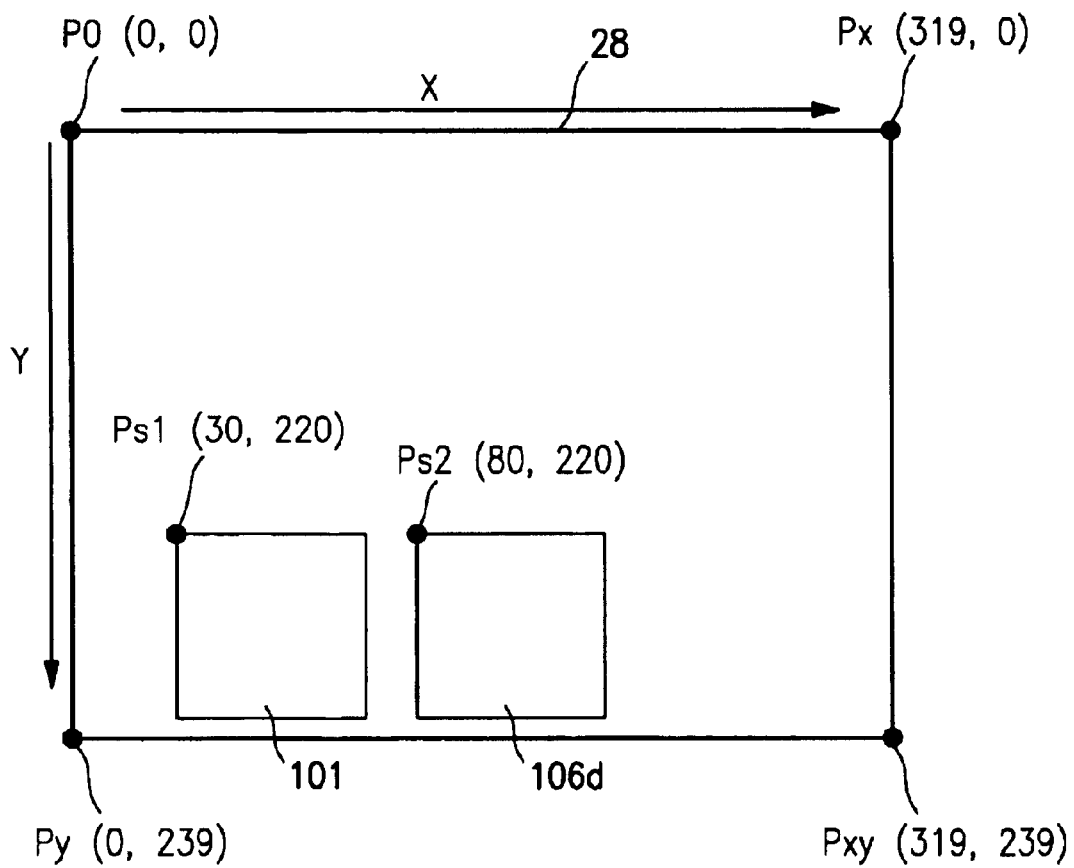
FIG. 15 is a diagram illustrating the positional information of the attached stamp.
Figure 16:
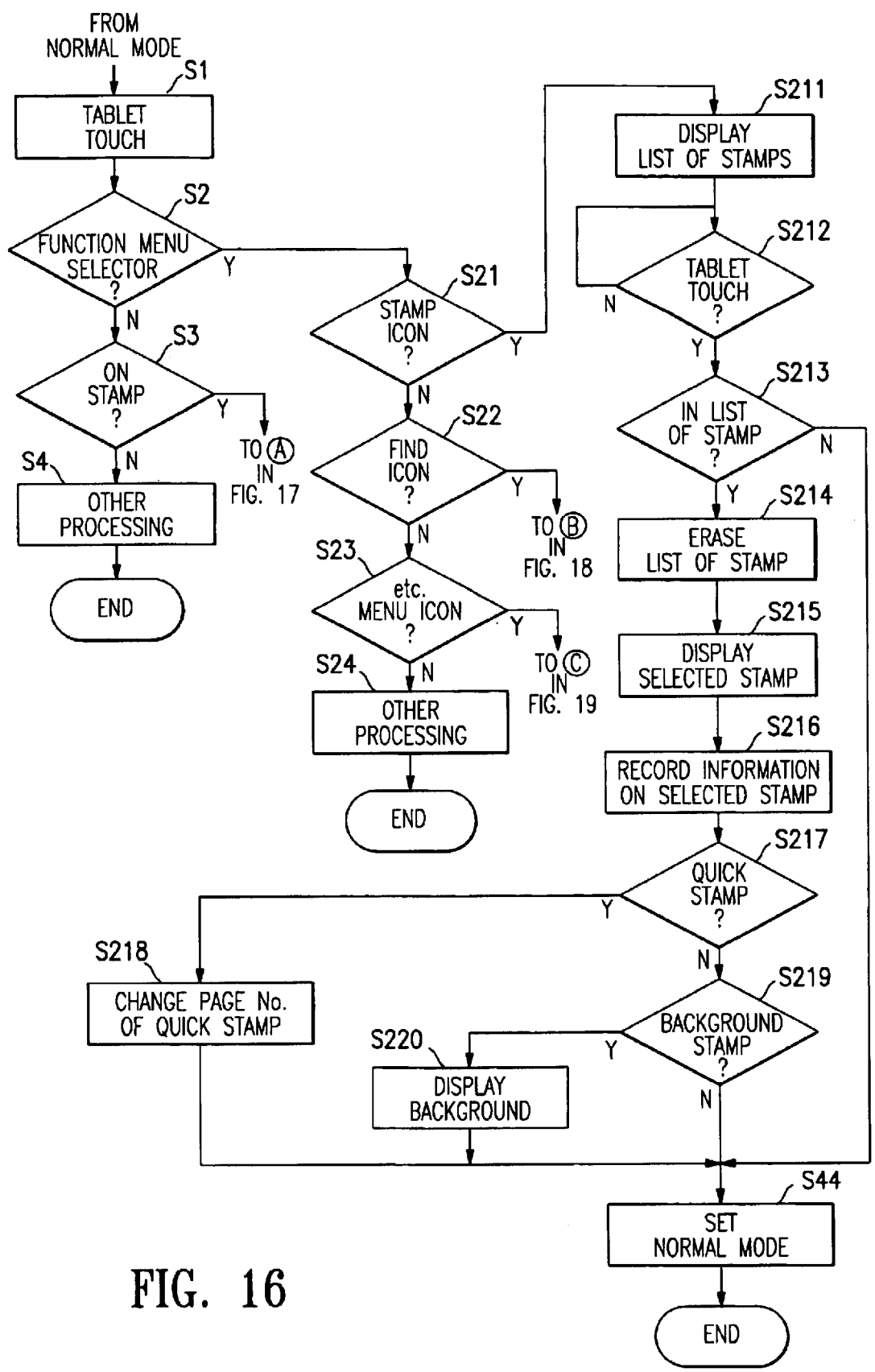
FIG. 16 is a flowchart illustrating a part of a processing procedure in the embodiment in accordance with the present invention.

As shown in FIG. 15, in the positional coordinate system indicating the location where the stamps are attached, the coordinate value of origin Po on the screen of the tablet 28 is defined as (0, 0); the coordinate value of Px in the direction of an x-axis is defined as (319, 0); the coordinate value of Px in the direction of a y-axis is defined as (0, 239); and the coordinate value of Pxy is defined as (319, 239). With the origin Po as the reference, the coordinate value of a predetermined point on a stamp, which is defined as Ps, indicates the position of the stamp. As a specific example, assuming that the coordinate value of Ps1 of one corner of the alarm stamp 101 is (30, 220) and the coordinate value of Ps2 of the party stamp 106d is (80, 220), these numeral values are written as illustrated in FIG. 14 associated with the codes representing the respective stamps. When the date and time for which the alarm has been set are, for example, 18:00 on Jan. 1, 1996, the numeral values indicating the date and time are written as shown in FIG. 14.

The descriptions of the aforesaid code numbers are shown in a code number correspondence table, not shown. For instance, a code number "0001" denotes the alarm stamp, a code number "0002" denotes the ToDo stamp, a code number "0003" denotes the quick stamp, a code number "0004" denotes the auto-erase stamp, a code number "1001" denotes the meeting stamp which is a regular stamp, a code number "1002" denotes the business card stamp which is a regular stamp, a code number "1003", indicates a telephone number stamp which is a regular stamp, a code number "2001" indicates the telephone memo stamp which is a background stamp, a code number "1004" indicates a party stamp which is a regular stamp a code number "2002" indicates a timetable stamp which is a background stamp, and code numbers "3001", and after denote user-defined stamps. Thus, the respective stamps are associated with the code numbers.

The entire processing in accordance with the present invention will be described with reference to the flowcharts shown in FIG. 16 through FIG. 19. First, referring to FIG. 16, if the tablet is touched from the normal mode (step S1), then the program determines whether the tablet touch has been made in the function menu area, i.e. the function menu selector 70 (step S2), and if the determination result is affirmative, then the program advances to a step S21; if the determination result is negative, then the program advances to a step S3.

In the step S3, the program decides whether any of the stamps displayed on the screen of the tablet 28 has been touched; if the determination result is affirmative, then the program goes to a step S31. In other words, the program goes to A shown in FIG. 17. If the program finds that no stamp has been touched, then it decides that other processing is to be performed and implements the specified processing (step S4). The processing in the step S4 is not directly related to the present invention; therefore, the description thereof will be omitted.

If the program decides in the step S2 that the function menu area has been touched, then it carries out the processing (steps S21 through S24) to determine which icon of the function menu selector 70 has been selected. In this embodiment, descriptions will be given with respect to the icon 71 called the "find" icon, the icon 72 for calling up the list of stamps, which is called the stamp icon, and the icon 76 called the "etc." icon because it specifies other menus. The descriptions of processing operations other than these will be omitted.

If the program determines in the step S21 that a stamp icon has been pressed, then it displays the list of stamps (step S211) and waits for a further tablet touch (step S212). When the tablet is touched again, the program decides whether the touch has been made within the list of stamps (step S213) and if the determination result is affirmative, then it erases the list of stamps (step S214) to display only the touched stamp (step S215). If the program decides in the step S213 that the touch has not been made within the list of stamps, then it sets the normal mode (step S44).

The program records the information indicating the type of the displayed or selected stamp; it also records the positional information, i.e. coordinate values, and the values denoting date, time, etc. as default values if the stamp is the alarm stamp or the like (step S216).

Then the program determines whether the selected stamp is the quick stamp (step S217) and if the determination result is affirmative, then it rewrites the page number of the page to which the quick stamp has been attached (step S218). In other words, since the quick stamp is allowed to be attached only to one page, if the page which is being processed currently is the fifth page and the quick stamp has been attached to the fifth page, then it rewrites the page number of the page with the quick stamp to "5." After that, the program sets the normal mode (step S44).

If the program determines in the step S217 that it is not the quick stamp which has been selected, then it further determines whether it is a background stamp (step S219); if it decides that it is a background stamp, then it displays a background as shown in FIG. 10 (step S220); if it decides that it is not a background, then it sets the normal mode (step S44).

Figure 17:
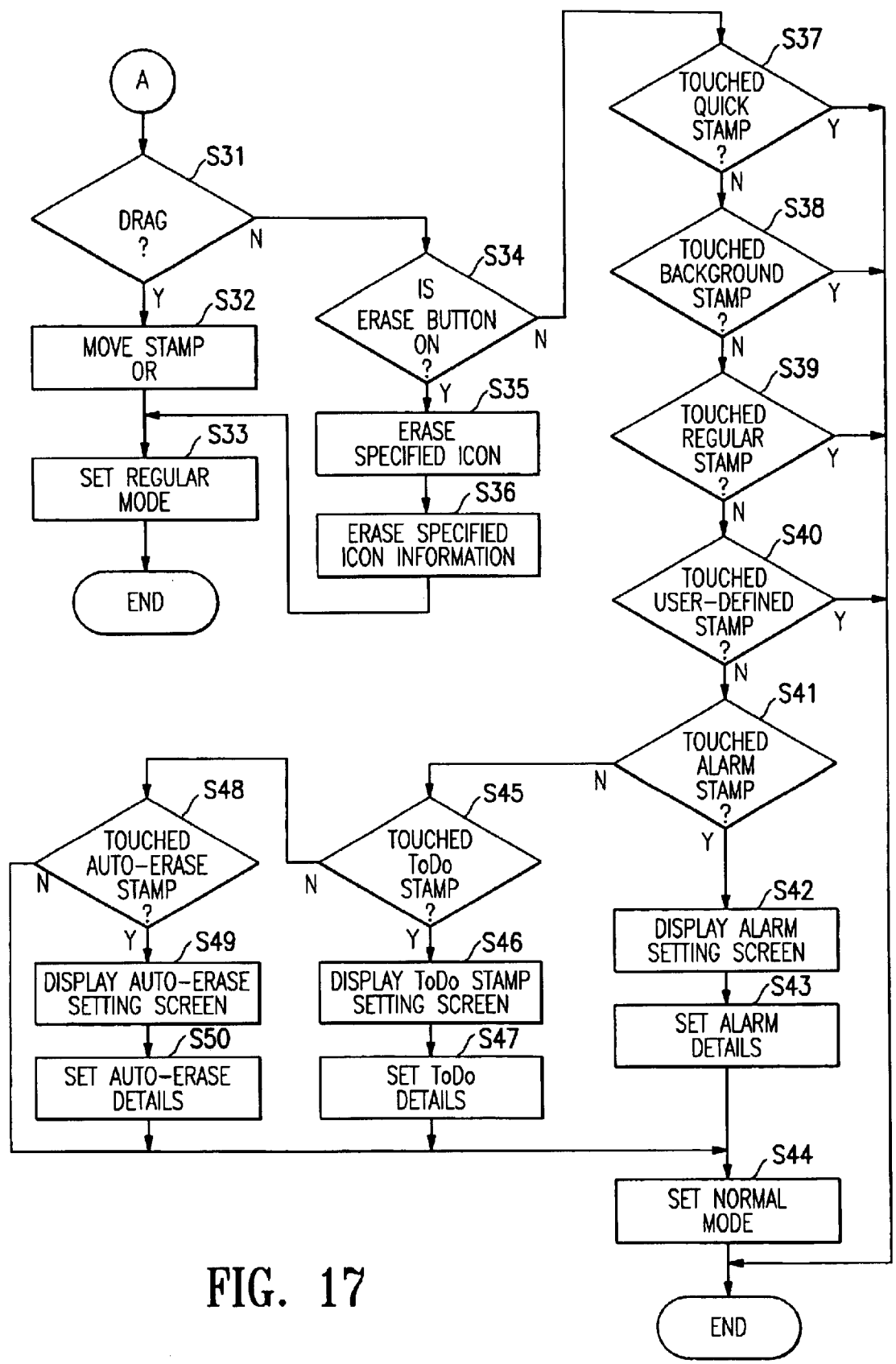
FIG. 17 is a flowchart illustrating a part of a processing procedure in the embodiment in accordance with the present invention.

Under the conditions that the next tablet touch is made on a stamp (step S3), then the program goes to the step S31 and after shown in FIG. 17.

More specifically, the program determines whether the touch on the stamp is a drag (step S31) and if the determination result is a drag, then it moves the stamp (step S32) before setting the normal mode (step S33).

If the determination result in S31 is negative, then the program decides whether the erase button has been depressed (step S34); if it decides that the erase button has been depressed, then it erases the icon which is being currently touched (step S35) and also erases the information related to the icon (e.g. if it is the alarm icon, then the date and time for which the alarm has been set will be erased) (step S36).

If the program decides in the step S34 that the erase button has not been depressed, that is if a certain stamp has been touched but it is not a drag and the erase button has not been depressed, then the program moves to the processing of a step S37 and after. The processing from the step S37 and after is for determining which stamp is currently being touched and for carrying out the associated processing. Under this condition, however, if the quick stamp, a background stamp, a normal stamp, a user.defined stamp, or the like is touched, no processing for them will be implemented (steps S37 through S40).

If the touched stamp is the alarm stamp (step S41), then the program displays the alarm setting screen as shown in FIG. 6B, for example (step S42). When the user enters alarm setting data (step S43), the program sets the normal mode (step S44).

If the program decides in the step S41 that it is not the alarm stamp, then it further determines whether it is a ToDo stamp (step S45); if the determination result is affirmative, then it displays the ToDo setting screen as shown, for example, in FIG. 7 (step-S46). When the user enters ToDo setting data (step S47), the program sets the normal mode (step S44).

If the program decides in the step S45 that it is not the ToDo stamp that has been touched, then it further determines whether it is the auto-erase stamp (step S48); if the determination result is affirmative, then it displays the auto-erase setting screen shown, for example, in FIG. 9 (step S49). When the user enters the auto-erase setting data (step S50), then the program sets the normal mode (step S44).

The above has described the processing for attaching various stamps and for setting functions. The following will describe other processing.

Referring back to FIG. 16, when there is a tablet touch (step S1) from the normal mode, the program determines whether the tablet touch has been made in the function menu selector area (step S2); if the determination result is affirmative, then the program advances to the step S21. If, however, the program decides in the step S21 that the touch in the function menu selector area is not a stamp icon, then it first decides whether the find icon has been touched (step S22).

Figure 18:
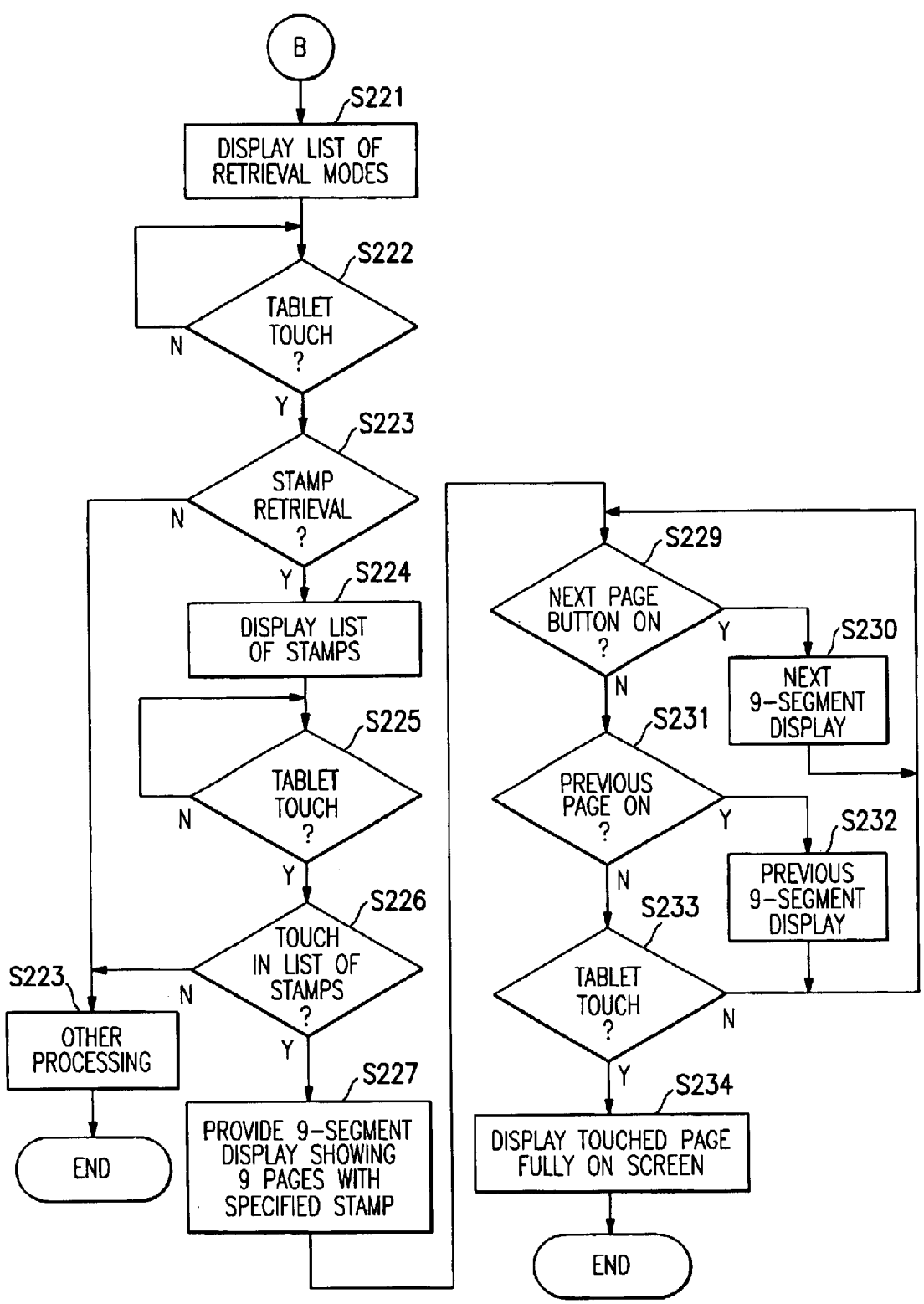
FIG. 18 is a flowchart illustrating a part of a processing procedure in the embodiment in accordance with the present invention.
Figure 19:
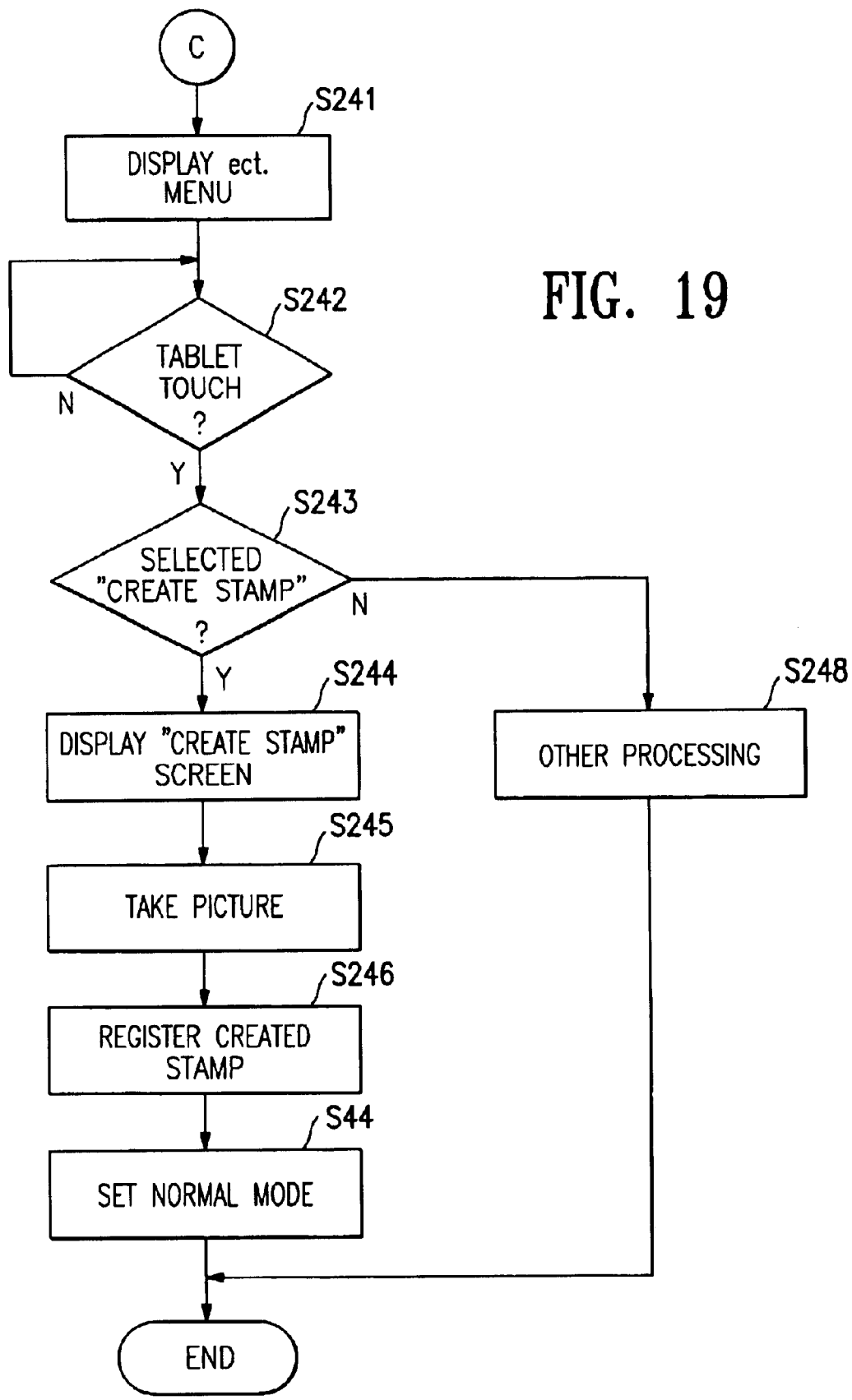
FIG. 19 is a flowchart illustrating a part of a processing procedure in the embodiment in accordance with the present invention.
Figure 20A:
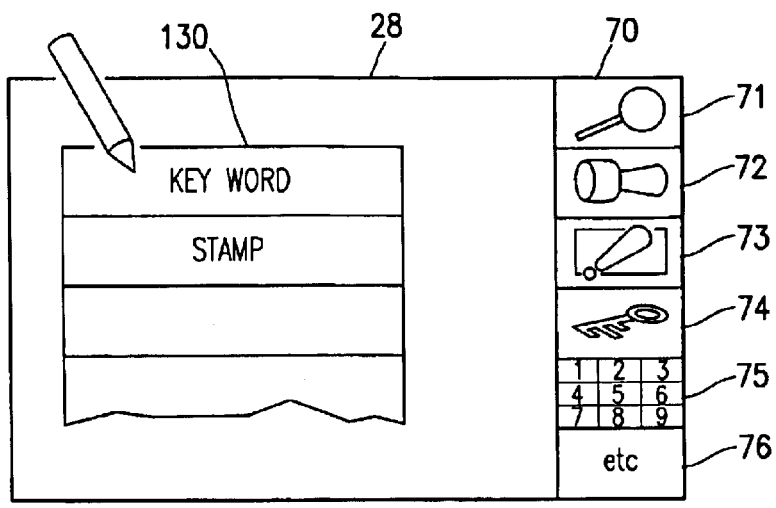
FIGS. 20A, 20B and 20C are diagrams illustrating a displaying operation for retrieving in the embodiment.
Figure 20B:
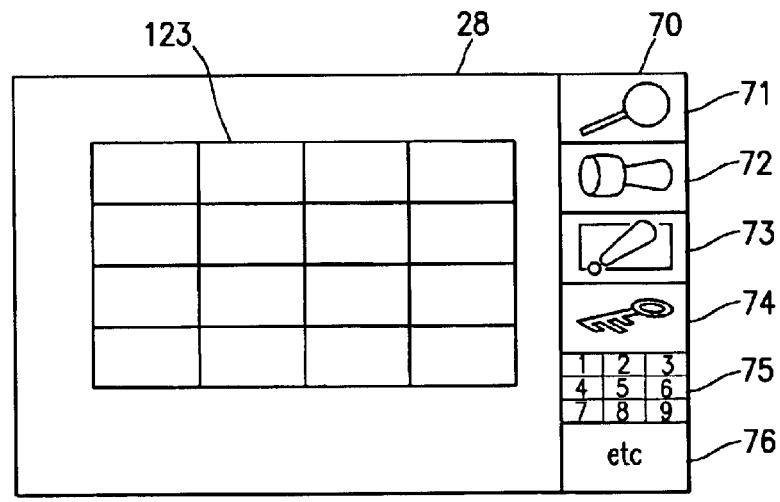

If the program determines that the find icon has been touched, then it proceeds to the processing implemented in the step S221, shown in FIG. 18. More specifically, when the icon indicating retrieval in the function menu selector 70 shown in FIG. 3 is touched, the program displays a list for retrieval 130 shown in FIG. 20A (step S221) and waits for a further tablet touch (step S222). When the "STAMP" is selected using the input pen 51 or the like from the list for retrieval 130 (step S223), the list of stamps 123 shown in FIG. 20B is displayed (step S224). The list of stamps 123 is the same list of stamps shown in FIG. 4. If the program decides in the step S223 that the "STAMP" has not been selected, then the program goes to other retrieval processing such as the retrieval of page information by keyword (step S228). This other retrieval is not directly connected with the present invention; therefore, the description thereof will be omitted.

Figure 20C:
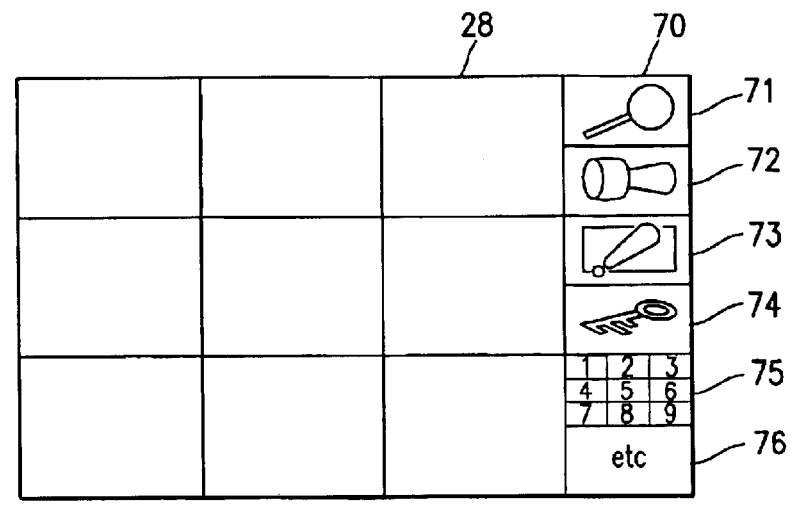
Figure 21:
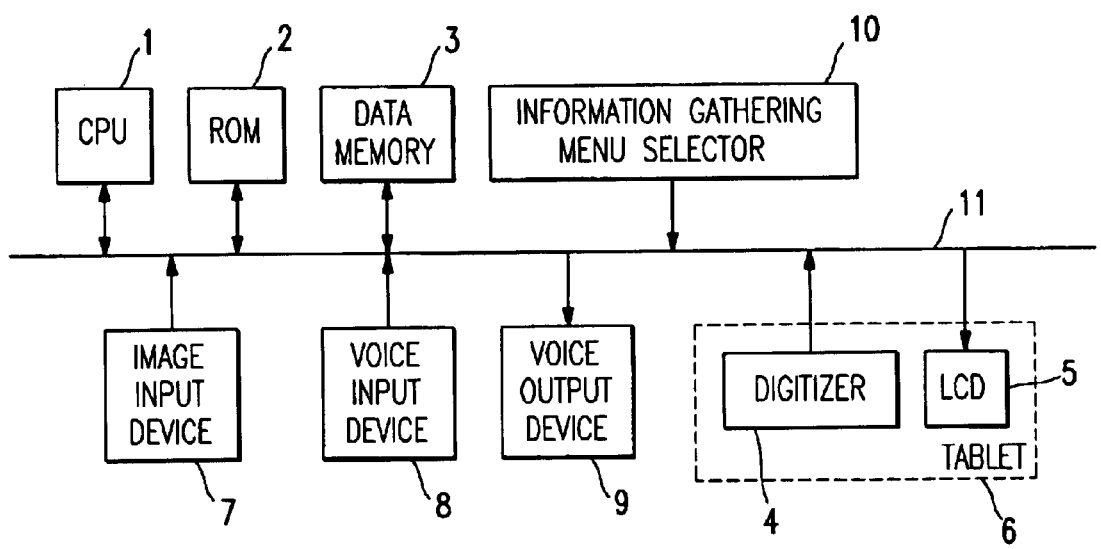
FIG. 21 is a block diagram showing a schematic configuration of a conventional multimedia information gathering apparatus.

When the list of stamps is displayed (step S224), the program waits for another tablet touch (step S225) and determines whether the tablet touch is for the list of stamps (step S226). If the program decides that the tablet touch is not for the list of stamps, then, it moves to an other processing (step S228); if it decides that the tablet touch specifies the list of stamps, then it reads and displays the page to which the specified stamp has been attached (step S227). The page is shown in the 9-segment display by dividing the screen of the tablet 28 into nine segments so that the information of nine pages may be displayed at the same time as shown in FIG. 20C. For instance, when the party stamp 106d is selected from the list of stamps, all the pages carrying the party stamp 106d are read and displayed on the tablet screen which is divided into nine segments.

The information captured in the respective nine pages is reduced and displayed in the nine areas resulting from dividing the tablet screen. The tablet screen is divided into nine areas from the aspect of retrieval efficiency and ease of viewing; if the individual pages are reduced too much, then they become difficult to see. The division of the screen, however, is not limited to nine segments; the number of segments for the division may be appropriately set according to the system or the like used.

If there are ten or more pages which have the specified stamp, then the 9-segment display will be given over two or more pages. For example, if there are twenty pages carrying the specified stamp, then the first and second pages provide the 9-segment display, each showing nine pages, and the third page provides the 9-segment display showing the information of the remaining two pages. Thus, when multiple 9-segment pages are displayed, the desired page information is obtained by moving to the next page or moving back to the previous page by using the page feeding buttons. This processing procedure is shown by steps S229 through S232.

When the user locates the desired page information from the 9-segment display and touches the page information by the input pen or the like (step S233), the touched page information is displayed over the entire screen of the tablet (step S234).

This ends the description of the retrieval processing in accordance with the present invention. The following will describe the processing implemented when the program decides in the step S22 shown in FIG. 16 that the touch on the function menu does not specify the "find" icon and further determines whether the touch specifies another menu icon; if the determination result is affirmative, then it moves to the processing implemented in a step S241 and after shown in FIG. 19. This processing will be described hereinafter.

When another menu icon is touched, the program displays the list of other menus 120 as shown in FIG. 11A (step S241) and waits for another tablet touch (step S242).

When "CREATE STAMP" is selected from the list of other menus (step S243), the program displays the stamp creating screen as shown in FIG. 11B (step S244). If the user selects other one than "CREATE STAMP" in the step S243, then the program moves to other processing (step S248). This other processing is not directly related to the embodiment of the present invention; therefore, the description thereof will be omitted.

When the stamp creating screen is displayed in the step S244, the user takes a picture (step S245) according to the procedure described above and registers the taken picture in the form of a user-defined stamp (step S246). As soon as the creation of the user-defined stamp is completed, the program sets the normal mode (step S247).

Thus, in the embodiment of the present invention, the alarm stamp, the ToDo stamp, the quick stamp, the auto-erase stamp, the background stamps, the regular stamps, etc. are prepared and attached to desired pages, thus enabling the user to set an alarm, ToDo, quick call, auto-erase, and other functions for respective page, or to classify the information by type, or to attach a background stamp such as the telephone memo to pages. Moreover, according to the invention, the user can create any desired stamps as necessary according to the type of page information.

The embodiment which has been described refers to the processing for capturing all the three types of information, namely, the image information, the voice information, and the ink information. It is obvious, however, that the present invention is also applicable to a case where only one type of information is captured.

Furthermore, a program for implementing the processing in accordance with the present invention can be stored in a storage medium such as a floppy disk; the present invention includes such a storage medium also.

Thus, according to the present invention, for the information which has been captured into individual pages, stamps can be attached to each of the pages according to the type of information captured in each page. These different stamps are attached to desired pages so as to set various functions such as the alarm, the ToDo, the quick call, and the auto-erase. In addition, background stamps including the telephone memo can be attached to any desired pages.

Furthermore, page information can be classified by type by using the regular stamps or user-defined stamps. These features are extremely convenient for managing or finding captured data.

Apparatus according to the invention can be assembled from convention, commercially available integrated circuit components of the type generally used in data processing apparatus. The required programming can be implemented by any competent programmer on the basis of knowledge possessed by those of ordinary skill in the art, the programming flow diagrams shown in the drawing of the present application and the detailed description provided above.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A portable information gathering apparatus which gathers information in units of pages, displays entered information for a selected page on a screen, and stores the gathered information, said apparatus comprising:

information input means for entering information;

attach-to-page icon setting means for attaching at least one icon matched to information entered as a page by the information input means, to the page, the icon corresponding to information captured on the page and defining the manner in which the page is to be managed; and data storage device for storing the page of information entered through the information input means and information defining the icon attached to the page at associated memory locations.

2. A portable information gathering apparatus according to claim 1, wherein said information input means comprise at least one of: an input/display tablet which includes the screen and captures information when the screen is touched; image input means for entering image information; and voice input means for entering spoken information.

3. A portable information gathering apparatus according to claim 2, wherein an icon attached to the specified page is at least one of: an icon for managing the information captured in respective pages by time-related data; an icon for specifying a particular page; an icon serving as a memorandum guide; and an icon for managing the information captured in the respective pages by the type of information.

4. A portable information gathering apparatus according to claim 3, wherein the information regarding the icon attached to a specified page written to the data storing means is information indicating the type of icon and positional information indicating the position where the icon is attached.

5. A portable information gathering apparatus according to claim 4, wherein an icon attached to the specified page is an icon for managing the information captured in respective pages by time-related data, and the icon information for the icon for managing information captured in the respective pages by time-related data includes time-related information including date and time as well as information indicating the type of icon and icon positional information.

6. A portable information gathering apparatus according to claim 1, wherein an icon attached to the specified page is at least one of: an icon for managing the information captured in respective pages by time-related data; an icon for specifying a particular page; an icon serving as a memorandum guide; and an icon for managing the information captured in the respective pages by the type of information.

7. A portable information gathering apparatus according to claim 6, wherein the information regarding the icon attached to a specified page written to the data storing means is information indicating the type of icon and positional information indicating the position where the icon is attached.

8. A portable information gathering apparatus according to claim 7 wherein an icon attached to the specified page is an icon for managing the information captured in respective pages by time-related data, and the icon information for the icon for managing information captured in the respective pages by time-related data includes time-related information including date and time as well as information indicating the type of icon and icon positional information.

9. A portable information gathering apparatus according to claim 1, wherein the at least one icon is pasted to the specified page.

10. An information managing method performed in a portable information gathering apparatus, which apparatus is constructed to gather information in units of pages, display entered information for a selected page on a screen, and store the gathered information, said method comprising:

attaching to a page at least one icon matched to information entered as a page equivalent to one screen by information input means, the icon corresponding to information captured on the page and defining the manner in which the page is to be managed;

displaying the at least one icon in a predetermined position on the page; and writing the page of information entered by the information input means together with information defining the attached icon at associated addresses in a data storage device, thus implementing information management based on the written information regarding the icon.

11. An information managing method according to claim 10, wherein the apparatus includes an input/display tablet which includes the screen and captures information when the screen is touched, and the information to be entered is at least one of: information captured through the input/display tablet; image information captured through image input means; and spoken information captured through voice input means.

12. An information managing method according to claim 11 wherein, the icon displayed on the page is at least one of: an icon for managing the information captured in respective pages by time-related data; an icon for specifying a particular page; an icon serving as a memorandum guide; and an icon for managing the information captured in the respective pages by the type of information.

13. An information managing method according to claim 12, wherein the information regarding the icon attached to a specified page written to the data storing means is information indicating the type of icon and positional information indicating the position where the icon is attached.

14. An information managing method according to claim 13, wherein an icon attached to the specified page is an icon for managing the information captured in respective pages by time-related data, and the icon information for the icon for managing information captured in the respective pages by time-related data includes time-related information including date and time as well as information indicating the type of icon and icon positional information.

15. An information managing method according to claim 10, wherein the icon displayed on the page is at least one of: an icon for managing the information captured in respective pages by time-related data; an icon for specifying a particular page; an icon serving as a memorandum guide; and an icon for managing the information captured in the respective pages by the type of information.

16. An information managing method according to claim 15, wherein the information regarding the icon attached to a specified page written to the data storing means is information indicating the type of icon and positional information indicating the position where the icon is attached.

17. An information managing method according to claim 16, wherein an icon attached to the specified page is an icon for managing the information captured in respective pages by time-related data, and the icon information for the icon for managing information captured in the respective pages by time-related data includes time-related information including date and time as well as information indicating the type of icon and icon positional information.

18. An information managing method according to claim 10, wherein the at least one icon is pasted to the page.

* * * * *